United States Patent
Choi et al.

(10) Patent No.: US 11,899,716 B2
(45) Date of Patent: Feb. 13, 2024

(54) CONTENT PROVIDING SERVER, CONTENT PROVIDING TERMINAL, AND CONTENT PROVIDING METHOD

(71) Applicant: NAVER CORPORATION, Seongnam-si (KR)

(72) Inventors: Byung Gyou Choi, Seongnam-si (KR); Sung Hyun Lee, Seongnam-si (KR); Sang Yoon Lee, Seongnam-si (KR); Jun Oh Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 168 days.

(21) Appl. No.: 17/236,512

(22) Filed: Apr. 21, 2021

(65) Prior Publication Data

US 2021/0240765 A1 Aug. 5, 2021

Related U.S. Application Data

(63) Continuation of application No. PCT/KR2019/013139, filed on Oct. 7, 2019.

(30) Foreign Application Priority Data

Oct. 31, 2018 (KR) .................. 10-2018-0131848

(51) Int. Cl.
*G06F 16/70* (2019.01)
*G06F 16/738* (2019.01)
(Continued)

(52) U.S. Cl.
CPC ............ *G06F 16/739* (2019.01); *G06F 16/71* (2019.01); *G06F 16/743* (2019.01); *G06F 16/75* (2019.01);
(Continued)

(58) Field of Classification Search
CPC ...... G06F 16/739; G06F 16/71; G06F 16/743; G06F 16/75; G06F 16/783; G06F 16/7867
See application file for complete search history.

(56) References Cited

U.S. PATENT DOCUMENTS

2012/0036431 A1   2/2012 Ito et al.
2012/0106925 A1*  5/2012 Dirik .............. H04N 21/234345
                                                      386/243
(Continued)

FOREIGN PATENT DOCUMENTS

KR   1020090131228 A   12/2009
KR   1020120005000 A    1/2012
(Continued)

OTHER PUBLICATIONS

Uchihashi et al., Video Manga: Generating Semantically Meaningful Video Summaries, MULTIMEDIA '99: Proceedings of the seventh ACM international conference on Multimedia (Part 1) Oct. 1999 [retrieved on Dec. 16, 2022]. Retrieved from the Internet: https://doi.org/10.1145/319463.319654 (Year: 1999).*

(Continued)

*Primary Examiner* — Kristopher Andersen
(74) *Attorney, Agent, or Firm* — GREER BURNS & CRAIN, LTD.

(57) ABSTRACT

An operation method of a user terminal for providing a video slide service includes uploading a UGC video to a server; receiving, from the server, scene meta-information for each playback section of the UGC video; generating a video slide file on the basis of the received scene meta-information for each playback section; classifying, according to categories, a plurality of pieces of page information configuring the video slide file; and generating a storybook corresponding to (Continued)

the UGC video on the basis of a plurality of page groups classified according to the categories.

18 Claims, 19 Drawing Sheets

(51) Int. Cl.
  *G06F 16/74* (2019.01)
  *G06F 16/783* (2019.01)
  *G06F 16/71* (2019.01)
  *G06F 16/75* (2019.01)
  *G06F 16/78* (2019.01)
(52) U.S. Cl.
  CPC ........ *G06F 16/783* (2019.01); *G06F 16/7867* (2019.01)

(56) References Cited

U.S. PATENT DOCUMENTS

| | | | |
|---|---|---|---|
| 2015/0019969 A1 | 1/2015 | Lee et al. | |
| 2017/0070779 A1* | 3/2017 | Kim | ................ H04N 21/475 |
| 2017/0083148 A1* | 3/2017 | Ahn | ................ G06F 3/1446 |
| 2017/0124427 A1* | 5/2017 | Park | ................ G06V 10/763 |
| 2017/0206929 A1 | 7/2017 | Jo et al. | |
| 2017/0330598 A1 | 11/2017 | Choi et al. | |

FOREIGN PATENT DOCUMENTS

| | | | |
|---|---|---|---|
| KR | 1020150009053 A | 1/2015 |
| KR | 1020150122673 A | 11/2015 |
| KR | 1020160044981 A | 4/2016 |
| KR | 1020160072511 A | 6/2016 |
| KR | 1020160135151 A | 11/2016 |
| KR | 1020170087307 A | 7/2017 |
| KR | 101769071 B1 | 8/2017 |
| WO | 2014134801 A1 | 9/2014 |

OTHER PUBLICATIONS

Notice of allowance issued in Korean application No. 10-2018-0131848, dated Jun. 8, 2020.
Office action issued in Korean application No. 10-2018-0131848, dated Oct. 22, 2019.
Office action issued in Korean application No. 10-2018-0127336, dated Apr. 6, 2020.
Office action issued in Korean application No. 10-2018-0127336, dated Jul. 25, 2019.
Choi et al.; U.S. Appl. No. 17/236,494, filed Apr. 21, 2021.

* cited by examiner

| ID (510) | TIME CODE (520) | REPRESENTATIVE IMAGE (530) | SOUND (540) | SUBTITLE (550) | IMAGE TAG (560) |

<CONFIGURATION OF SCENE META-INFORMATION FRAME>

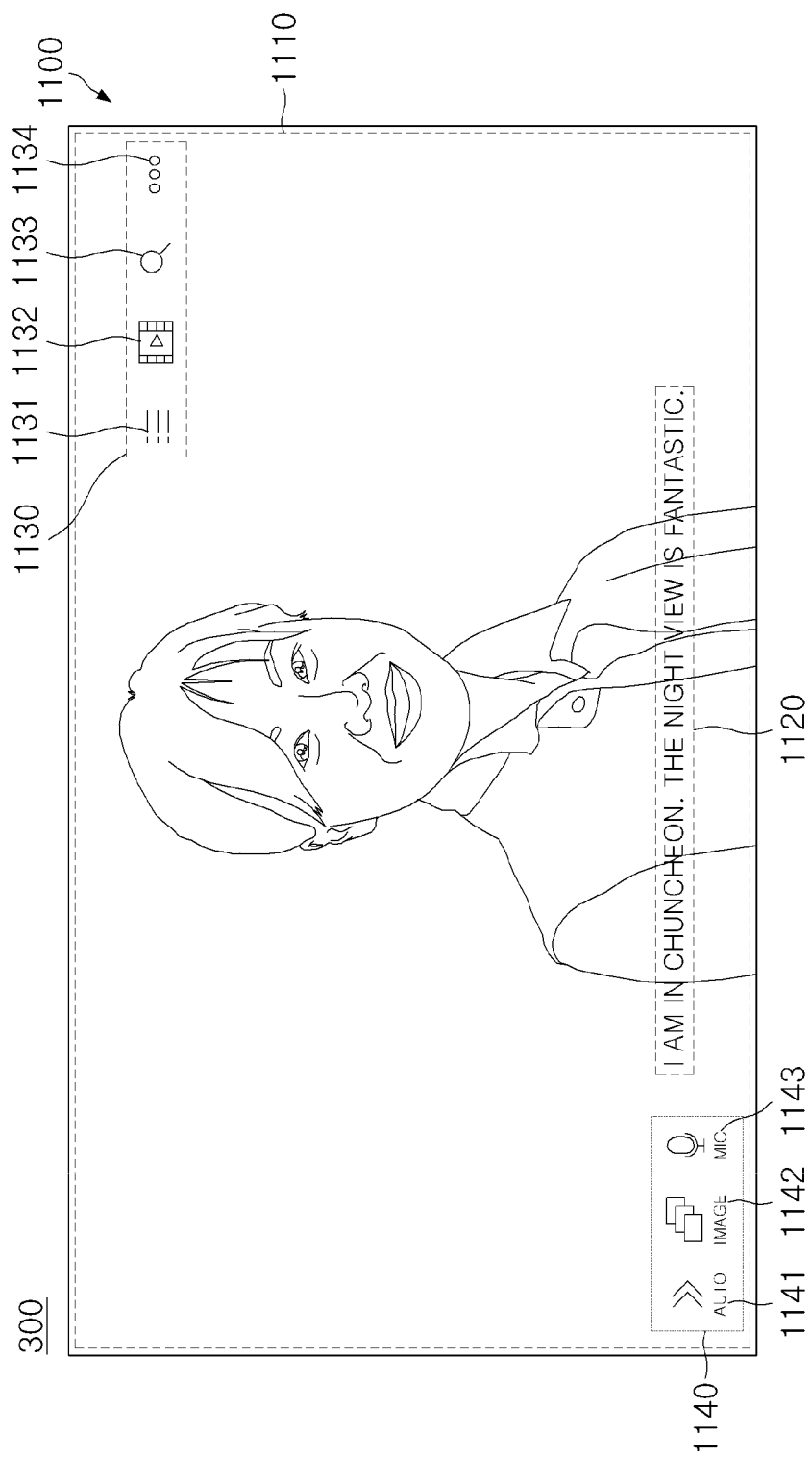

CONTENT PROVIDING SERVER, CONTENT PROVIDING TERMINAL, AND CONTENT PROVIDING METHOD

CROSS-REFERENCE TO RELATED APPLICATIONS

This application is a continuation of PCT Application No. PCT/KR2019/013139 filed on 7 Oct. 2019, which claims priority to Korean Patent Application No. 10-2018-0131848 filed on 31 Oct. 2018 in the Korean Intellectual Property Office, the entire contents of which are hereby incorporated by reference in their entirety.

BACKGROUND OF THE INVENTION

Field of the Invention

The present disclosure relates to a content providing server, a content providing terminal, and a content providing method, and more particularly, to a content providing server, a content providing terminal, and a content providing method for providing a video slide service using information extracted from user-generated content (UGC).

Background of the Invention

Due to the development of information and communication technology and popular culture, various types of video content are being produced and spread all over the world. In the case of video content, unlike a book, a viewer cannot arbitrarily control the pace of a video in progress and is thus compelled to watch the video regardless of whether the viewer understands the video. Therefore, to solve this problem, various methods for controlling the playback time of a video or for searching through a video are proposed.

As a representative method for controlling the playback time of a video, control using a progress bar is employed. According to this method, when a viewer selects an arbitrary point on the progress bar, the playback time of a video is moved to the selected point.

The progress bar has a constant length regardless of the playback time of a video. Thus, when a video has a long playback time, even a small movement on the progress bar causes a significant change in the playback time of the video, making it difficult to finely control the playback time. In particular, when watching a video in a mobile environment, it is more difficult to control the playback time of the video because a display has a small size and it is often necessary to control the progress bar with a finger.

Further, when a user tries to understand the content of a video in an environment with limited communication speed, if the video is high-capacity or high-quality, the video cannot be smoothly provided from the server to a content providing terminal, making it difficult to watch all scenes of the video in real time. Therefore, there is a need for a new video service that enables a viewer to watch video content by turning over pages like a book.

BRIEF SUMMARY OF THE INVENTION

The present disclosure has been made to address the above-mentioned problems and other problems. An aspect of the present disclosure is to provide a content providing server, a content providing terminal, and a content providing method for generating scene meta-information for each playback section based on information extracted from user-generated content (UGC) and for providing a video slide service based on the scene meta-information for each playback section.

Another aspect is to provide a content providing server, a content providing terminal, and a content providing method for generating a plurality of pages for providing a video slide service based on scene meta-information for each playback section about user-generated content (UGC) and for providing the plurality of pages grouped by category.

To achieve the foregoing or other aspects, an embodiment of the present disclosure provides an operating method of a user terminal including: uploading a user-generated content (UGC) video to a server; receiving scene meta-information for each playback section of the UGC video from the server; generating a video slide file based on the received scene meta-information for each playback section; classifying a plurality of pieces of page information forming the video slide file by category; and generating a storybook corresponding to the UGC video based on a plurality of page groups classified by category.

Another embodiment of the present disclosure provides a user terminal including: a communication unit configured to provide a communication interface with a server; a display unit configured to display a predetermined user interface; and a control unit configured to upload a user-generated content (UGC) video to the server using an upload menu item included in the user interface, to generate a video slide file based on scene meta-information for each playback section of the UGC video upon receiving the scene meta-information for each playback section from the server, to classify a plurality of pieces of page information forming the video slide file by category, and to generate a storybook corresponding to the UGC video based on a plurality of page groups classified by category.

Still another embodiment of the present disclosure provides a computer program recorded in a computer-readable storage medium to perform, on a computer, a process of uploading a user-generated content (UGC) video to a server, a process of receiving scene meta-information for each playback section of the UGC video from the server, a process of generating a video slide file based on the received scene meta-information for each playback section, a process of classifying a plurality of pieces of page information forming the video slide file by category, and a process of generating a storybook corresponding to the UGC video based on a plurality of page groups classified by category.

BRIEF DESCRIPTION OF THE DRAWINGS

FIG. 5 is a diagram illustrating the configuration of a scene meta-information frame according to an embodiment of the present disclosure;

FIG. 11 and FIG. 12 are diagrams illustrating an operation in which a user terminal displays a UGC video by pages.

DETAILED DESCRIPTION OF THE INVENTION

Figure 1:
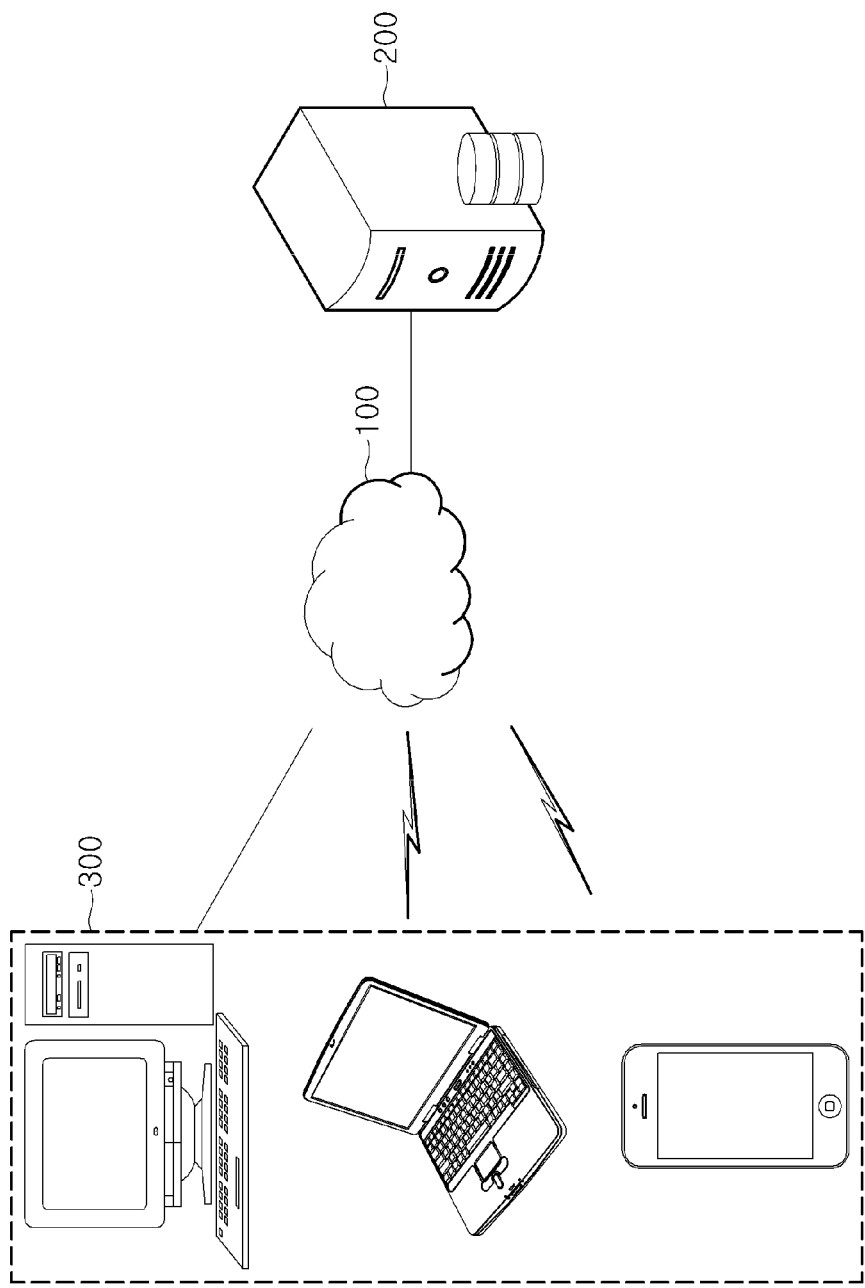
FIG. 1 is a diagram illustrating the configuration of a content providing system according to an embodiment of the present disclosure.

Hereinafter, embodiments disclosed herein will be described in detail with reference to the accompanying drawings, in which like or similar elements are denoted by like reference numerals regardless of drawing numerals and redundant descriptions thereof will be omitted. As used herein, the terms 'module' and 'unit' for components are given or interchangeably used only for ease in writing the specification and do not themselves have distinct meanings or functions. That is, the term 'unit' used herein refers to software or a hardware component, such as FPGA or ASIC, and a 'unit' performs certain functions. However, a 'unit' is not limited to software or hardware. A 'unit' may be configured to be stored in an addressable storage medium or may be configured to enable one or more processors to be executed. Thus, in one example, a 'unit' includes components, such as software components, object-oriented software components, class components, and task components, processes, functions, properties, procedures, subroutines, segments of a program code, drivers, firmware, a microcode, circuitry, data, a database, data structures, tables, arrays, and variables. Functions provided in components and 'units' may be combined into a smaller number of components and 'units' or may be further divided into additional components and 'units.'

When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical features disclosed herein are not limited by the accompanying drawings but include all modifications, equivalents, or substitutes included in the spirit and technical scope of the present disclosure.

The present disclosure proposes a content providing server, a content providing terminal, and a content providing method for generating scene meta-information for each playback section based on information extracted from user-generated content (UGC) and for providing a video slide service based on the scene meta-information for each playback section. In addition, the present disclosure proposes a content providing server, a content providing terminal, and a content providing method for generating a plurality of pages for providing a video slide service based on scene meta-information for each playback section about user-generated content (UGC) and for providing the plurality of pages grouped by category.

As described herein, user-generated content (UGC) is video content produced by a terminal user and refers to a moving image including one or more image frames and audio frames. In some cases, the user-generated content may include a subtitle file (or subtitle information).

A video slide service refers to a video service that enables a viewer (user) to quickly and easily understand the content of a video by turning over the pages of the video like a book.

Scene meta-information is information for identifying scenes forming video content (i.e., a moving image) and includes at least one of a time code, representative image information, subtitle information, and sound (i.e. voice) information. The time code is information about a subtitle section or a sound section of the video content, the representative image information is information about a representative image of the subtitle or sound section, the sound information is unit sound information corresponding to the subtitle or sound section, and the subtitle information is unit subtitle information corresponding to the subtitle or sound section.

The sound section is information about a time section in which a unit sound is output in the playback section of the video content and may include 'sound start time information' about a playback time point of the video content at which output of each unit sound starts, 'sound end time information' about a playback time point of the video content at which output of each unit sound ends, and 'sound output time information' about time in which output of each unit sound is maintained. Alternatively, the sound section may include only the 'sound start time information' and the 'sound end time information'.

The subtitle section is information about a section in which a unit subtitle is displayed in the playback section of the video content and may include 'subtitle start time information' about a playback time point of the video content at which display of each unit subtitle starts, 'subtitle end time information' about a playback time point of the video content at which display of each unit subtitle ends, and 'subtitle display time information' about time in which display of each unit subtitle is maintained. Alternatively, the subtitle section may include only the 'subtitle start time information' and the 'subtitle end time information'.

Hereinafter, various embodiments of the present disclosure will be described in detail with reference to the attached drawings.

FIG. 1 illustrates the configuration of a content providing system according to an embodiment of the present disclosure.

Referring to FIG. 1, the content-providing system 10 according to the present disclosure may include a communication network 100, a server 200, and a user terminal 300.

The server 200 and the user terminal 300 may be connected to each other through the communication network 100. The communication network 100 may include a wired network and a wireless network and may specifically include various networks, such as a local area network (LAN), a metropolitan area network (MAN), and a wide area network (WAN). The communication network 100 may also include the known World Wide Web (WWW). However, the communication network 100 according to the present disclosure is not limited to the listed networks but may include at least one of a known wireless data network, a known telephone network, and a known wired/wireless television network.

The server 200 may be a service providing server or a content providing server and may perform a function of providing a communication service requested by the user terminal 300. For example, when the server 200 is a web server, the server 200 may construct content requested by the user terminal 300 in the form of a web page and may provide the content to the terminal 300. In another example, when the server 200 is a multimedia providing server, the server 200 may construct multimedia content requested by the user terminal 300 in the form of a transmission file and may provide the multimedia content to the terminal 300.

The server 200 may generate scene meta-information for each playback section including at least one of a time code, representative image information, subtitle information, and sound information based on video content stored in a database or video content uploaded from the user terminal 300 and may provide the scene meta-information about the video content to the user terminal 300. Here, a playback section for generating scene meta-information may be a subtitle section or a sound section. Therefore, 'scene meta-information for each playback section' may be referred to as 'scene meta-information for each subtitle section' or 'scene meta-information for each sound section'.

The server 200 may provide a video slide service to the user terminal 300 using the scene meta-information about the video content. To this end, the server 200 may generate a plurality of pieces of page information based on the scene meta-information for each playback section about the video content (i.e., the time code, the representative image information, the subtitle information, and the sound information) for each reproduction section of the video content. Here, the page information (or video slide information) is information for providing the video slide service and is information in which at least one of representative image information, unit subtitle information, and unit sound information is constructed in the form of a page. In addition, the server 200 may generate a video slide file including the plurality of pieces of page information and may provide the video slide file to the user terminal 300.

The user terminal 300 may provide a communication service based on information provided from the server 200. For example, when the server 200 is a web server, the user terminal 300 may provide a web service based on content provided from the server 200. In another example, when the server 200 is a multimedia providing server, the user terminal 300 may provide a multimedia service based on content provided from the server 200.

The user terminal 300 may download and install an application for playing video content and/or providing an additional service (e.g., a video slide service) associated with video content. Here, the user terminal 300 may access an App Store, a Play Store, or the like to download the application or may download the application through a separate storage medium. In addition, the user terminal 300 may download the application through wired/wireless communication with the server 200 or a different device.

The user terminal 300 may upload video content (e.g., a UGC video) to the server 200 according to a user command or the like. The user terminal 300 may receive at least one of video content, scene meta-information for each playback section about the video content, and a video slide file including pieces of page information corresponding to the scene meta-information from the server 200.

The user terminal 300 may generate a plurality of pieces of page information based on scene meta-information about video content received from the server 200 or scene meta-information about video content stored in a memory. In addition, the user terminal 300 may generate scene meta-information for each playback section based on video content received from the server 200 or video content stored in the memory and may generate a plurality of pieces of page information using the scene meta-information.

The user terminal 300 may provide a video playback service based on video content received from the server 200 or stored in the memory. In addition, the user terminal 300 may provide a video slide service based on scene meta-information for each playback section about video content.

The user terminal 300 described herein may include a mobile phone, a smartphone, a laptop computer, a desktop computer, a digital broadcasting device, a personal digital assistant (PDA), a portable multimedia player (PMP), a slate PC, a tablet PC, an Ultrabook, a wearable device (e.g., a smartwatch, smart glasses, and a head-mounted display (HMD)), or the like.

Although this embodiment shows that the user terminal 300 interworks with the server 200 to provide a video slide service, the present disclosure is not necessarily limited thereto. Instead, it will be apparent to those skilled in the art that the user terminal 300 can independently provide video slide services without interworking with the server 200.

Figure 2:
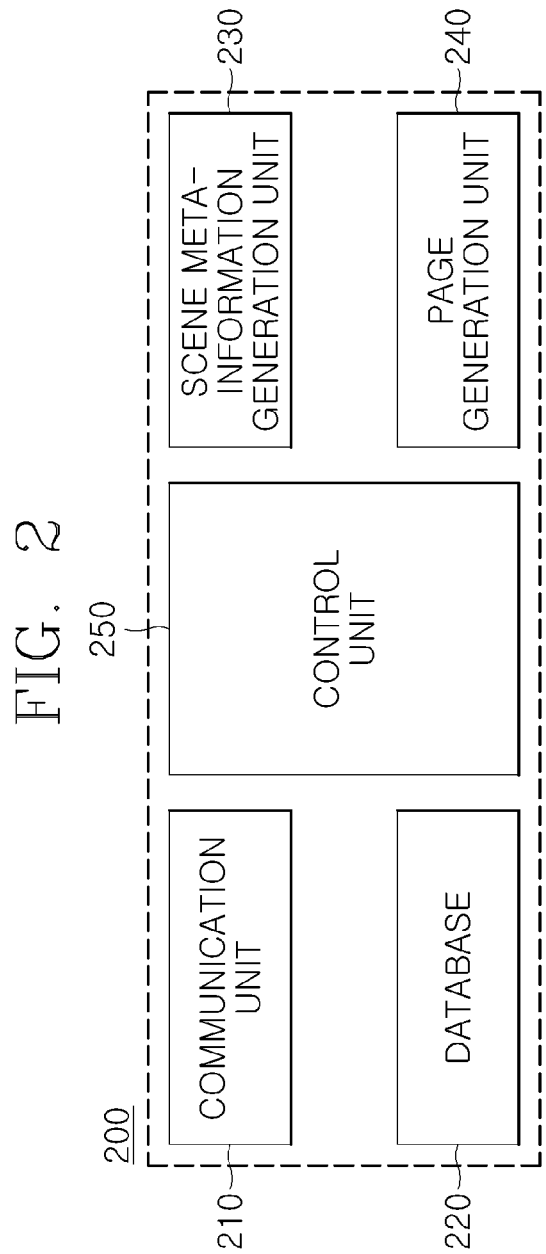
FIG. 2 is a block diagram illustrating the configuration of a server according to an embodiment of the present disclosure.

FIG. 2 is a block diagram illustrating the configuration of the server 200 according to an embodiment of the present disclosure.

Referring to FIG. 2, the server 200 according to the present disclosure may include a communication unit 210, a database 220, a scene meta-information generation unit 230, a page generation unit 240, and a control unit 250. The components illustrated in FIG. 2 are not necessarily essential to configure the server 200, and the server described herein may have more or fewer components than the components listed above.

The communication unit 210 may include a wired communication module for supporting wired communication and a wireless communication module for supporting wireless communication. The wired communication module may transmit or receive a wired signal to or from at least one of a different server, a base station, and an access point (AP) via a wired communication network established according to technical standards or communication modes for wired communication (e.g., Ethernet, power-line communication (PLC), Home PNA, IEEE 1394, and the like). The wireless communication module may transmit or receive a wireless signal to or from at least one of a base station, an access point, and a relay via a wireless communication network established according to technical standards or communication modes for wireless communication (e.g., a wireless LAN (WLAN), wireless fidelity (Wi-Fi), Digital Living Network Alliance (DLNA), Global System For Mobile Communications (GSM), code-division multiple access (CDMA), wideband CDMA (WCDMA), Long-Term Evolution (LTE), LTE-Advanced (LTE-A), and the like).

In this embodiment, the communication unit 210 may transmit video content, scene meta-information for each playback section about the video content, a video slide file including pieces of page information corresponding to the scene meta-information, or the like stored in the database 220 to a user terminal 300. Further, the communication unit 210 may receive video content uploaded by the user terminal 300, information about a video slide service requested by the user terminal 300, or the like.

The database 220 may function to store information (or data) received from the user terminal 300 or a different server (not shown), information (or data) autonomously generated by the server 200, information (or data) to be transmitted to the user terminal 300 or a different server, or the like. In this embodiment, the database 200 may store a plurality of pieces of video content, scene meta-information for each playback section about the plurality of pieces of video content, a video slide file including pieces of page information corresponding to the scene meta-information, or the like.

The scene meta-information generation unit 230 may generate scene meta-information for each playback section including at least one of a time code, representative image information, subtitle information, and sound information based on video content stored in the database 220 or video content uploaded from the user terminal 300. To this end, the scene meta-information generation unit 230 may extract a plurality of sound sections based on audio information extracted from the video content and may generate sound information and subtitle information corresponding to each sound section through sound recognition of audio information about each sound section. Further, the scene meta-information generation unit 230 may extract a plurality of sound sections based on audio information extracted from the video content and may generate representative image information about each sound section through sound recognition of audio information about each sound section and image recognition of image information about each sound section.

Representative image information is image information representing a subtitle or sound section of video content and may include at least one of successive image frames of the video content played within the subtitle or sound section. Specifically, the representative image information may be an image frame arbitrarily selected from among the image frames within the subtitle or sound section or an image frame (e.g., the foremost image frame in the subtitle or sound section, the middle image frame, the last image frame, an image frame most similar to subtitle information, or the like) selected from among the image frames according to a predetermined rule.

The page generation unit 240 may generate a plurality of pieces of page information based on scene meta-information for each playback section about video content. That is, the page generation unit 240 may generate page information using at least one of representative image information, subtitle information, and sound information. The page generation unit 240 may generate a video slide file including a plurality of pieces of page information corresponding to scene meta-information for each playback section. When the user terminal 300 generates page information corresponding to scene meta-information for each playback section instead of the server 200, the page generation unit 240 may be configured to be omitted.

The control unit 250 controls the overall operation of the server 200. The control unit 250 may control a combination of at least one of the foregoing components in order to implement various embodiments to be described below on the server 200 according to the present disclosure.

In this embodiment, the control unit 250 may provide a communication service requested by the user terminal 300. For example, the control unit 250 may provide a video playback service or a video slide service to the user terminal 300. To this end, the control unit 250 may provide video content stored in the database 220 to the user terminal 300. Further, the control unit 250 may generate scene meta-information for each playback section based on information extracted from video content and provide the scene meta-information for each playback section to the user terminal 300. In addition, the control unit 250 may generate a video slide file including on a plurality of pieces of page information based on scene meta-information for each playback section about video content and provide the video slide file to the user terminal 300.

Figure 3:
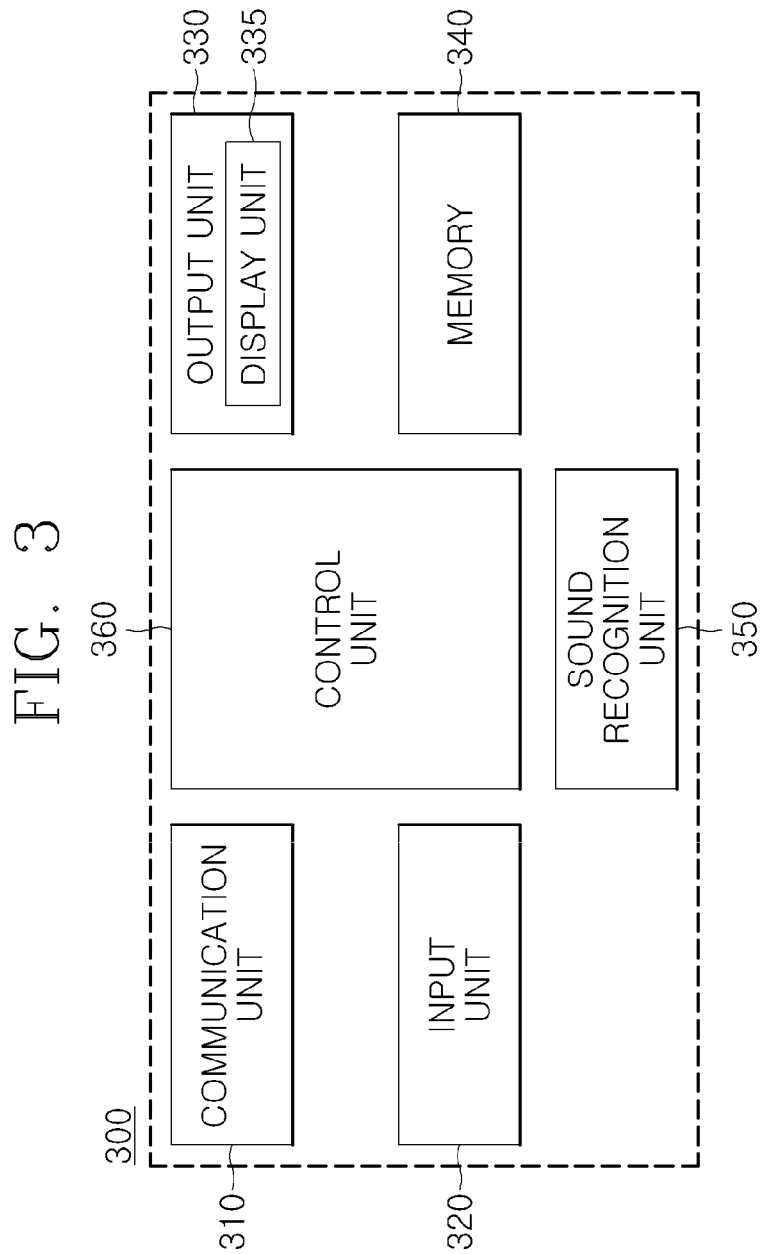
FIG. 3 is a block diagram illustrating the configuration of a user terminal according to an embodiment of the present disclosure.

FIG. 3 is a block diagram illustrating the configuration of the user terminal 300 according to an embodiment of the present disclosure.

Referring to FIG. 3, the user terminal 300 according to the present disclosure may include a communication unit 310, an input unit 320, an output unit 330, a memory 340, a sound recognition unit 350, and a control unit 360. The components illustrated in FIG. 3 are not necessarily essential to configure the user terminal 300, and the user terminal described herein may have more or fewer components than the components listed above.

The communication unit 310 may include a wired communication module for supporting a wired network and a wireless communication module for supporting a wireless network. The wired communication module may transmit or receive a wired signal to or from at least one of an external server and a different terminal via a wired communication network established according to technical standards or communication modes for wired communication (e.g., Ethernet, power-line communication (PLC), Home PNA, IEEE 1394, and the like). The wireless communication module may transmit or receive a wireless signal to or from at least one of a base station, an AP, and a relay via a wireless communication network established according to technical standards or communication modes for wireless communication (e.g., a wireless LAN (WLAN), wireless fidelity (Wi-Fi), Digital Living Network Alliance (DLNA), Global System For Mobile Communications (GSM), code-division multiple access (CDMA), wideband CDMA (WCDMA), Long-Term Evolution (LTE), LTE-Advanced (LTE-A), and the like).

In this embodiment, the communication unit 310 may receive video content, scene meta-information for each playback section about the video content, a video slide file including a plurality of pieces of page information corresponding to the scene meta-information for each playback section, or the like from a server 200. Further, the communication unit 310 may transmit video content uploaded by the user terminal 300, information about a video slide service requested by the user terminal 300, or the like to the server 200.

The input unit 320 may include a camera for inputting an image signal, a microphone for inputting an audio signal, a user input unit (e.g., a keyboard, a mouse, a touch key, or a mechanical key) for receiving information from a user, or the like. Data obtained by the input unit 320 may be analyzed and processed as a control command of a terminal user. In this embodiment, the input unit 320 may receive command signals associated with a video playback service and a video slide service.

The output unit 330 is for generating output associated with a visual, auditory, or tactile sense and may include at least one of a display unit, a sound output unit, a haptic module, and a light output unit.

The display unit 335 displays (outputs) information processed by the user terminal 300. In this embodiment, the display unit may display execution screen information about a video playback program driven in the user terminal 300, execution screen information of a video slide program driven in the user terminal 300, or user interface (UI) information or graphical user interface (GUI) information according to execution screen information. The display unit 335 may form a layer structure along with a touch sensor or is integrated therewith, thereby configuring a touchscreen.

The touchscreen may not only function as a user input unit that provides an input interface between the user terminal 300 and a viewer but also provide an output interface between the user terminal 300 and the viewer.

The sound output unit may output audio data received from the communication unit 310 or stored in the memory 340. In this embodiment, the sound output unit may output a sound signal associated with the video playback service or the video slide service provided from the user terminal 300.

The memory 340 stores data for supporting various functions of the user terminal 300. In this embodiment, the memory 340 may store the video playback program (or application) driven in the user terminal 300, the video slide program (or application) driven in the user terminal 300, and data and instructions for the operation of the user terminal 300. In addition, the memory 340 may store a plurality of pieces of image content, scene meta-information for each playback section about the plurality of pieces of image content, a video slide file including a plurality of pieces of page information corresponding to the scene meta-information, or the like.

The memory 340 may include a storage medium of at least one type among a flash memory type, a hard disk type, a solid state disk (SSD) type, a silicon disk drive (SDD) type, a multimedia card micro type, a memory card type (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The sound recognition unit 350 may classify a sound signal by analyzing characteristics of the sound signal input through a microphone and may detect textualized sound information by performing sound recognition on the sound signal. Here, the sound recognition unit 350 may use a predetermined sound recognition algorithm.

The sound recognition unit 350 may provide the detected textualized sound information to the control unit 360. In this embodiment, the sound information detected through the sound recognition unit 360 may be used as a control command of the user.

The control unit 360 controls an operation associated with the video playback program or the video slide program stored in the memory 340 and generally controls the overall operation of the user terminal 300. The control unit 360 may control a combination of at least one of the foregoing components in order to implement various embodiments to be described below on the user terminal 300 according to the present disclosure.

In this embodiment, the control unit 360 may provide the video playback service based on video content received from the server 200 or stored in the memory 340. In addition, the control unit 360 may provide the video slide service based on scene meta-information for each playback section about video content received from the server 200. The control unit 360 may also provide the video slide service based on a video slide file related to video content received from the server 200.

In another embodiment, the control unit 360 may directly generate scene meta-information for each playback section using video content received from the server 200 or stored in the memory 340, may generate a plurality of pieces of page information corresponding to the scene meta-information for each playback section, and may provide the video slide service based on the plurality of pieces of page information.

The control unit 360 may analyze the scene meta-information for each playback section received from the server 200 and may group the plurality of pieces of pages information by category. In one example, the control unit 360 may detect a predetermined number of pieces of category information by analyzing subtitle information about all pages and may group the plurality of pieces of pages information based on the detected pieces of category information. The category information for each page may be used to provide a storybook service.

Figure 4:
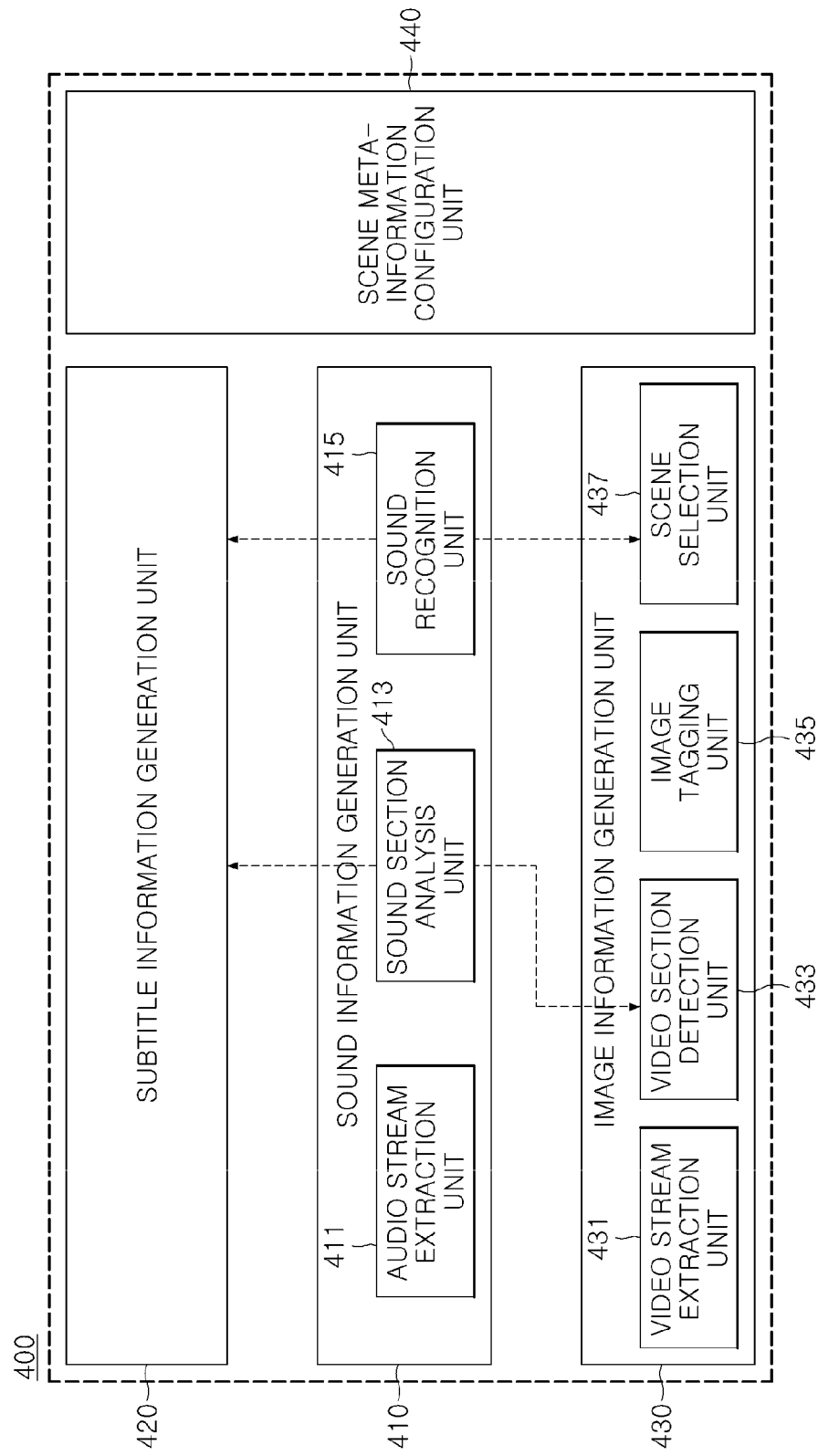
FIG. 4 is a block diagram illustrating a scene meta-information generation device according to an embodiment of the present disclosure.

FIG. 4 is a block diagram illustrating a scene meta-information generation device according to an embodiment of the present disclosure.

Referring to FIG. 4, the scene meta-information generation device 400 according to the present disclosure may include a sound information generation unit 410, a subtitle information generation unit 420, an image information generation unit 430, and a scene meta-information configuration unit 440. The components illustrated in FIG. 4 are not necessarily essential to configure the scene meta-information generation device 400, and the scene meta-information generating device described herein may have more or fewer components than the components listed above.

The scene meta-information generation device 400 may be configured as the scene meta-information generation unit 230 of the server 200 or may be configured as the control unit 360 of the user terminal 300 but is not necessarily limited thereto.

The sound information generation unit 410 may detect a plurality of sound sections based on audio information extracted from video content and may generate a plurality of pieces of sound information corresponding to the detected sound sections. In addition, the sound information generation unit 410 may generate textualized sound information by performing sound recognition on audio information about each sound section.

The sound information generation unit 410 may include an audio stream extraction unit 411 to detect audio information about video content, a sound section analysis unit 413 to detect sound sections of video content, and a sound recognition unit 415 to perform sound recognition of audio information about each sound section.

The audio stream extraction unit 411 may extract an audio stream based on an audio file included in video content. The audio stream extraction unit 411 may divide the audio stream into a plurality of audio frames suitable for signal processing. Here, the audio stream may include a sound stream and a non-sound stream.

The sound section analysis unit 413 may analyze a frequency component, a pitch component, mel-frequency cepstral coefficients (MFCCs), and a linear predictive coding (LPC) coefficient of each audio frame, thereby extracting characteristics of the audio frame. The sound section analysis unit 413 may determine whether each audio frame is a sound section using the characteristics of each audio frame and a predetermined sound model. Here, as the sound model, at least one of a support vector machine (SVM) model, a hidden Markov model (HMM) model, a Gaussian mixture model (GMM) model, a recurrent neural network (RNN) model, and a long short-term memory (LSTM) model may be used.

The sound section analysis unit 413 may combine audio frames corresponding to a sound section and may detect the start time and the end time of each sound section. Here, the start time of each sound section may correspond to a playback time of the video content at which sound output starts in the section, and the end time of each sound section corresponds to a playback time of the video content at which the sound output ends in the section. The audio section analysis unit 413 may provide information about the sound section of the video content to the subtitle information generation unit 420 and/or the image information generation unit 430.

The sound recognition unit 415 may analyze a frequency component, a pitch component, an energy component, a zero-crossing component, MFCCs, an LPC coefficient, and a perceptual linear predictive (PLP) coefficient of sound information corresponding to each sound section, thereby detecting feature vectors of the sound information. The sound recognition unit 415 may classify a pattern of the detected feature vectors using a predetermined sound model and may recognize a sound through the pattern classification, thereby detecting one or more candidate words. Further, the sound recognition unit 415 may generate textualized sound information by constructing a sentence using the candidate words based on a predetermined language model. The sound recognition unit 415 may provide the textualized sound information to the subtitle information generation unit 420 and/or the image information generation unit 430.

The subtitle information generation unit 420 may generate a plurality of pieces of subtitle information corresponding to the sound sections of the video content based on the textualized sound information received from the sound information generation unit 410. That is, when a subtitle file does not exist in the video content, the subtitle information generation unit 420 may generate new subtitle information by performing sound recognition of the audio information included in the video content.

When a subtitle file exists in the video content, the subtitle information generation unit 420 may detect a plurality of subtitle sections based on the subtitle file and may detect pieces of subtitle information corresponding to the subtitle sections. In this case, the subtitle information generation unit 420 may correct the plurality of subtitle sections and/or the pieces of subtitle information using the audio information extracted from the video content.

The image information generation unit 430 may detect a video section corresponding to each sound section and may select a scene image most similar to the text information or the textualized sound information (i.e., a representative image) from among a plurality of scene images existing in the video section.

The image information generation unit 430 may include a video stream extraction unit 431 to detect image information forming video content, a video section detection unit 433 to detect a video section corresponding to each sound section, an image tagging unit 435 to generate tag information from images of each video section, and a scene selection unit 327 to select a representative image from among the images of each video section.

The video stream extraction unit 431 may extract a video stream based on a video file included in the video content. Here, the video stream may include successive image frames.

The video section extraction unit 433 may detect a video section corresponding to each sound section from the video stream. This process is for excluding a video section of relatively low importance (i.e., a video section corresponding to a non-sound section), thereby reducing time and cost required for image processing.

The image tagging unit 435 may generate image tag information by performing image recognition on each of a plurality of images (i.e., image frames) existing in each video section. That is, the image tagging unit 435 may generate image tag information by recognizing objects (e.g., a human being, an object, text, and the like) existing in each image frame. Here, the image tag information may include information about any object existing in each image frame.

The scene selection unit 437 may measure similarity between first vector information corresponding to the image tag information and second vector information corresponding to the textualized sound information using a predetermined similarity measurement method. As the similarity measurement method, at least one of a cosine similarity measurement method, a Euclidean similarity measurement method, a similarity measurement method using a Jaccard coefficient, a similarity measurement method using a Pearson correlation coefficient, and a similarity measurement method using Manhattan distance may be used.

The scene selection unit 437 may detect an image corresponding to image tag information having the highest similarity to the textualized sound information from the plurality of images existing in each video section and may select the detected image as a representative image of the section.

In another embodiment, the scene selection unit 437 may detect an image corresponding to image tag information having the highest similarity to the subtitle information from the plurality of images existing in each video section and may select the detected image as a representative image of the section.

The scene meta-information configuration unit 440 may construct scene meta-information for each playback section based on sound section information, unit subtitle information, unit sound information, and representative image information obtained from the sound information generation unit 410, the subtitle information generation unit 420, and the image information generation unit 430.

For example, as illustrated in FIG. 5, the scene meta-information configuration unit 440 may generate a scene meta-information frame 500 including an ID field 510, a time code field 520, a representative image field 530, a sound field 540, a subtitle field 550, and an image tag field 560. Here, the scene meta-information configuration unit 440 may generate as many scene meta-information frames as the number of subtitles or sound sections.

The ID field 510 is a field for identifying scene meta-information for each playback section, and the time code field 520 is a field indicating a subtitle or sound section corresponding to the scene meta-information. Preferably, the time code field 520 is a field indicating a sound section corresponding to the scene meta-information.

The representative image field 530 is a field indicating a representative image for each sound section, and the sound field 540 is a field indicating sound information about each sound section. The subtitle field 550 is a field indicating subtitle information about each sound section, and the image tag field 560 is a field indicating image tag information about sound audio section.

When representative images of pieces of scene meta-information corresponding to adjacent playback sections are similar, the scene meta-information configuration unit 440 may merge the pieces of scene meta-information into a single piece of scene meta-information. Here, the scene meta-information configuration unit 440 may determine similarity between the representative images using a predetermined similarity measurement algorithm (e.g., a cosine similarity measurement algorithm, a Euclidean similarity measurement algorithm, or the like).

As described above, the scene meta-information generation device 400 according to the present disclosure may generate scene meta-information for each playback section based on information extracted from video content. The scene meta-information for each playback section may be used to provide a video slide service.

Figure 6:
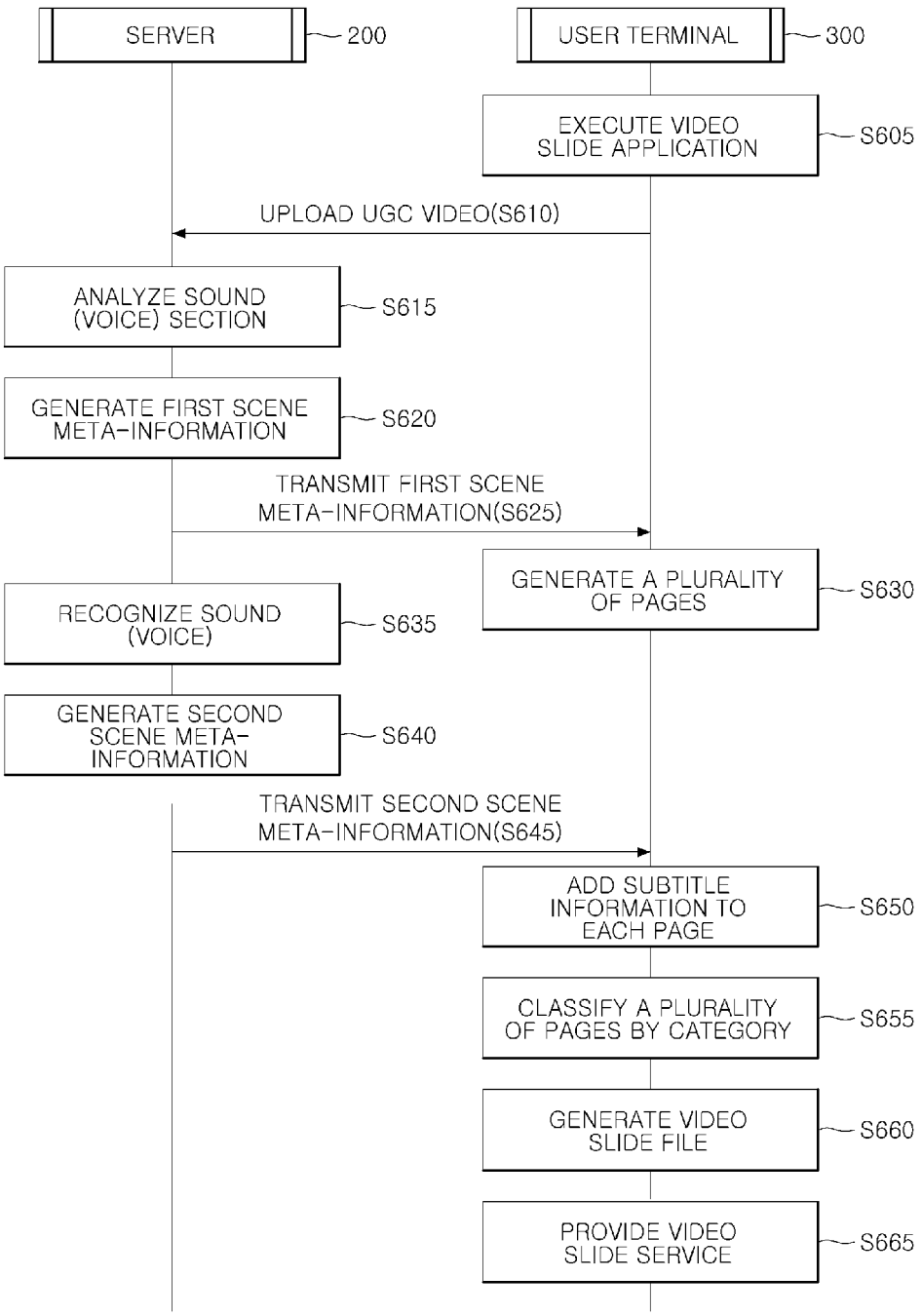
FIG. 6 is a flowchart illustrating signaling of a content providing system according to an embodiment of the present disclosure.

FIG. 6 is a flowchart illustrating the operation of the content providing system 10 according to an embodiment of the present disclosure.

Referring to FIG. 6, the user terminal 300 may execute a video slide application according to a user command or the like (S605). Here, the video slide application is an application that provides a user interface enabling viewing of a video by turning over pages like a book.

When the application is executed, the user terminal 300 may display a predefined user interface (UI) on the display unit 335. When a UGC video is selected through an upload menu item of the user interface, the user terminal 300 may upload the selected UGC video to the server 200 (S610).

The server 200 may detect audio information from the UGC video uploaded from the user terminal 300 and may extract information about sound sections of the video based on the detected audio information (S615).

The server 200 may generate first scene meta-information including a time code, representative image information, and sound information for each playback section using the extracted information about the sound sections (S620). The server 200 may store the UGC video uploaded from the user terminal 300 and the first scene meta-information about the UGC video in a database.

The server 200 may transmit the first scene meta-information to the user terminal 300 (S625). Here, the server 200 may transmit this data by a streaming method. The user terminal 300 may generate a plurality of pages based on the first scene meta-information received from the server 200 (S630). Here, the plurality of pages does not include subtitle information.

The server 200 may generate textualized sound information by performing sound recognition of sound information corresponding to each sound section (S635). The server 200 may generate subtitle information for each playback section based on the textualized sound information and may generate second scene meta-information including the subtitle information for each playback section (S640). The server 200 may store the second scene meta-information about the UGC video in the database.

The server 200 may transmit the second scene meta-information to the user terminal 300 (S645). Likewise, the server 200 may transmit this data by a streaming method. Although this embodiment shows that the server 200 completes sound recognition of all sound sections and then transmits subtitle information about all the sound sections, the present disclosure is not limited thereto. Instead, it will be apparent to those skilled in the art that the server 200 can transmit subtitle information corresponding to each sound section whenever performing sound recognition of the sound section.

The user terminal 300 may add subtitle information to each page using the second scene meta-information received from the server 200 (S650). That is, the user terminal 300 may generate a plurality of pieces of page information based on the first and second scene meta-information. Here, each piece of page information is information for providing a video slide service and is information in which at least one of representative image information, subtitle information, and sound information is configured in a page form. For example, each piece of page information may include representative image information and subtitle information or may include representative image information, subtitle information, and sound information.

The user terminal 300 may group (classify) the plurality of pieces of page information by analyzing scene meta-information for each playback section (S655).

The user terminal 300 may generate a video slide file including the plurality of pieces of page information and category information for each page (S660). The user terminal 300 may store the video slide file in a memory.

The user terminal 300 may provide the video slide service based on the video slide file stored in the memory (S665). Accordingly, a terminal user may view the UGC video produced by the terminal user in page units like a book. Further, the terminal user may selectively view only a subject of interest among various subjects included in the UGC video.

Although this embodiment shows that the server 200 sequentially generates and transmits the first scene meta-information and the second scene meta-information due to the difference between the time required for sound section analysis and the time required for sound recognition, the present disclosure is not limited thereto. Therefore, it will be apparent to those skilled in the art that one scene meta-information data may be generated and transmitted to the user terminal after both sound section analysis and sound recognition are completed.

In another embodiment, the server 200 may generate not only scene meta-information for each playback section about the UGC video but also a video slide file including on a plurality of pieces of page information corresponding to the scene meta-information for each playback section and may transmit the scene meta-information and the video slide file to the user terminal 300.

Figure 7:
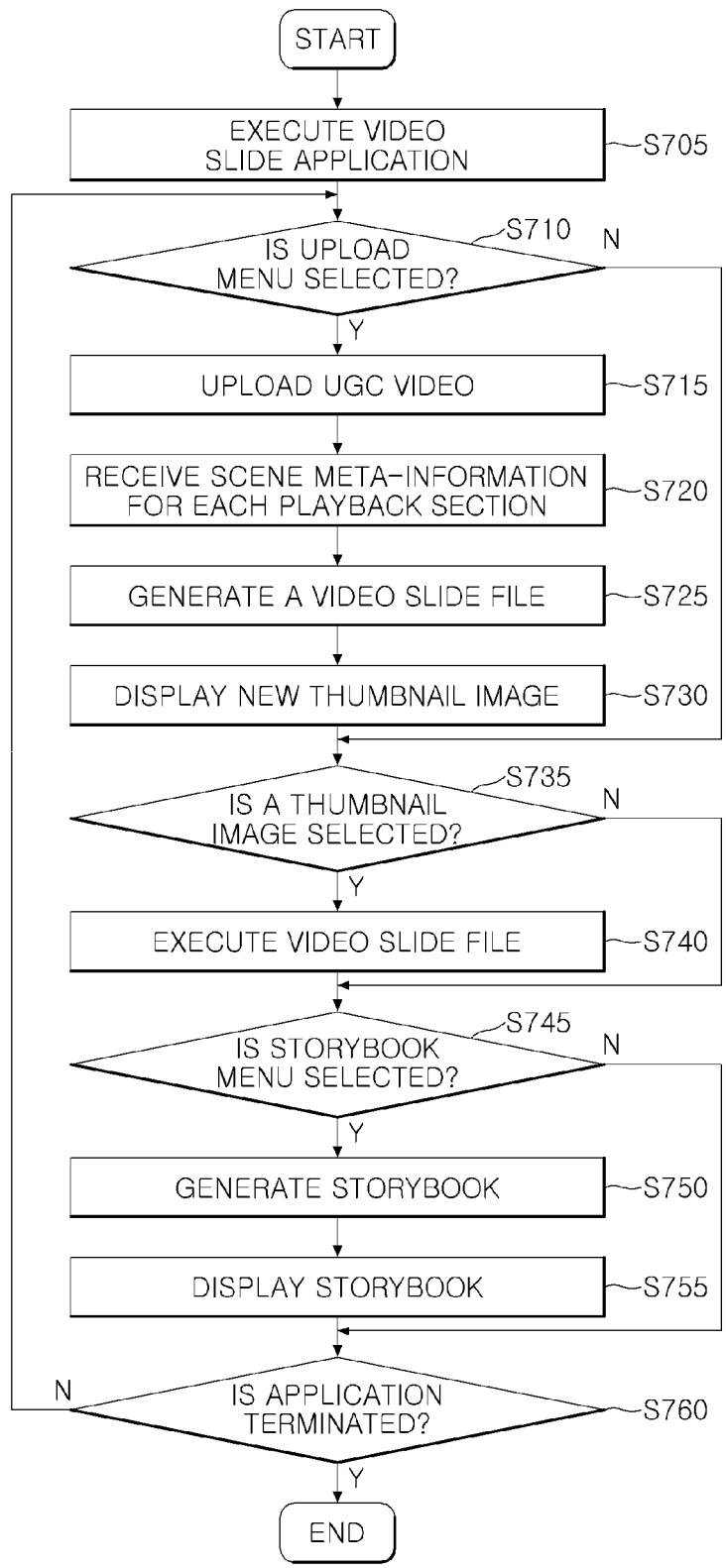
FIG. 7 is a flowchart illustrating the operation of a user terminal according to an embodiment of the present disclosure.

FIG. 7 is a flowchart illustrating the operation of the user terminal 300 according to an embodiment of the present disclosure.

Referring to FIG. 7, the user terminal 300 may execute a video slide application according to a user command or the like (S705).

When the application is executed, the user terminal 300 may display a predefined user interface on the display unit 335. Here, the user interface may include an image list area including thumbnail images corresponding to video slide files and a menu area including operation menu items of the video slide application but is not limited thereto.

When an upload menu item is selected through the user interface (S710), the user terminal 300 may display a selection list screen including thumbnail images corresponding to UGC videos stored in a memory on the display unit 335. When at least one UGC video is selected on the selection list screen, the user terminal 300 may upload the selected UGC video to the server 200 (S715).

In another embodiment, when the upload menu item is selected, the user terminal 300 may enter a video recording mode and may generate a new UGC video in real time. When video recording is completed, the user terminal 300 may upload the generated new UGC video to the server 200.

The server 200 may generate scene meta-information for each playback section based on information included in the UGC video uploaded from the user terminal 300. The server 200 may transmit the scene meta-information for each playback section to the user terminal 300.

The user terminal 300 may receive the scene meta-information for each playback section about the uploaded UGC video from the server 200 (S720). The user terminal 300 may generate a video slide file including pieces of page information corresponding to the scene meta-information for each playback section and category information for each page and may store the video slide file in the memory (S725). The user terminal 300 may display a thumbnail image corresponding to the video slide file stored in the memory in the image list area of the user interface (S730).

When the thumbnail image displayed on the user interface is selected (S735), the user terminal 300 may enter a video slide mode and may execute the video slide file corresponding to the selected thumbnail image (S740).

In the video slide mode, the user terminal 300 may display the screen of a first page among a plurality of pages forming the video slide file on the display unit 335. Here, the screen of the page may include representative image information and subtitle information. In addition, when the screen of the page is displayed, the user terminal 300 may output sound information corresponding to the page.

When a storybook menu item is selected in the video slide mode (S745), the user terminal 300 may generate a storybook based on the video slide file corresponding to the UGC video (S750).

For example, the user terminal 300 may classify the plurality of pages forming the video slide file by category based on the category information stored in the video slide file. The user terminal 300 may generate a storybook based on a plurality of page groups classified by category.

The user terminal 300 may display a user interface (i.e., a storybook screen) including storybook items corresponding to the plurality of page groups on the display unit (S755). Each storybook item may include at least one of a thumbnail image corresponding to each page group, category information (i.e., title information) about the page group, and information about the number of pages in the page group. The thumbnail image is an image obtained by reducing a representative image of each page group to a predetermined size.

When one of the storybook items displayed on the storybook screen is selected, the user terminal 300 may display only a page belonging to a page group corresponding to the selected storybook item on the display unit 335. Accordingly, a terminal user may selectively view only a subject of interest among various subjects included in the UGC video.

The user terminal 300 may display the screen of a next page or the screen of a previous page on the display unit 335 in response to a predetermined gesture input (e.g., a directional flicking input). Further, the user terminal 300 may switch (move) a page screen related to the UGC video at high speed in response to a predetermined gesture input (e.g., a long touch input). In a sound recognition mode, the user terminal 300 may execute a video slide operation corresponding to a user's voice command. For example, the user terminal 300 may perform a page turning function, a mode switch function (video slide mode ⇔ video mode), a subtitle search function, an automatic playback function, a deletion/editing/sharing function, or the like through the voice command.

The user terminal 300 may repeatedly perform operation 710 to operation 755 described above until the video slide application is terminated (S760). Although this embodiment shows that the video slide service is provided by an independent application, the present disclosure is not limited thereto. Instead, it will be apparent to those skilled in the art that the video slide service may be provided through an additional function of a general video playback application.

Figure 8A:
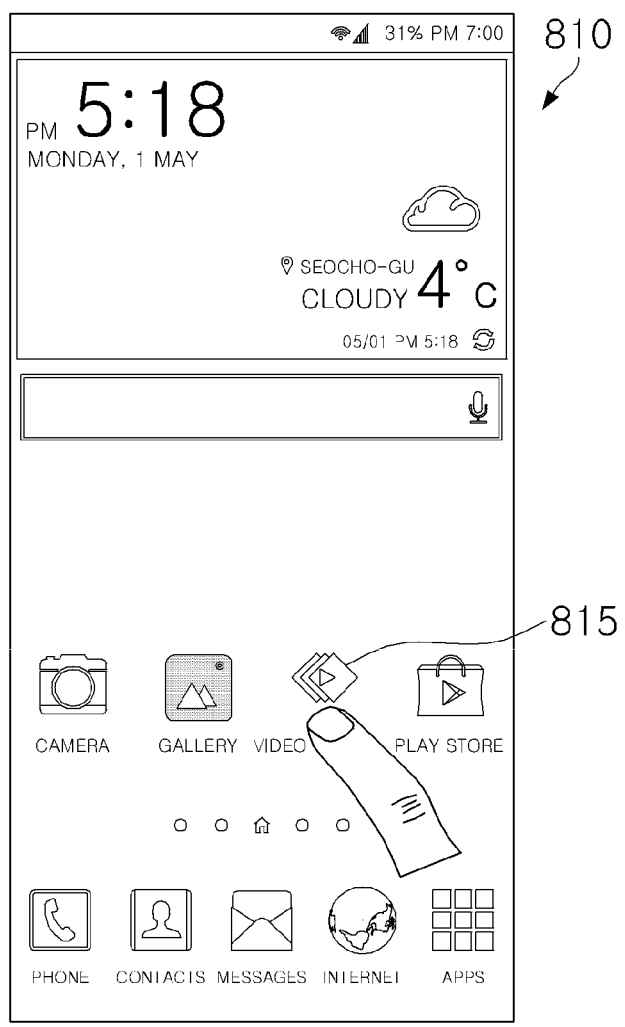
FIGS. 8A and 8B are diagrams illustrating an operation in which a user terminal displays a main screen of a video slide application.
Figure 8B:
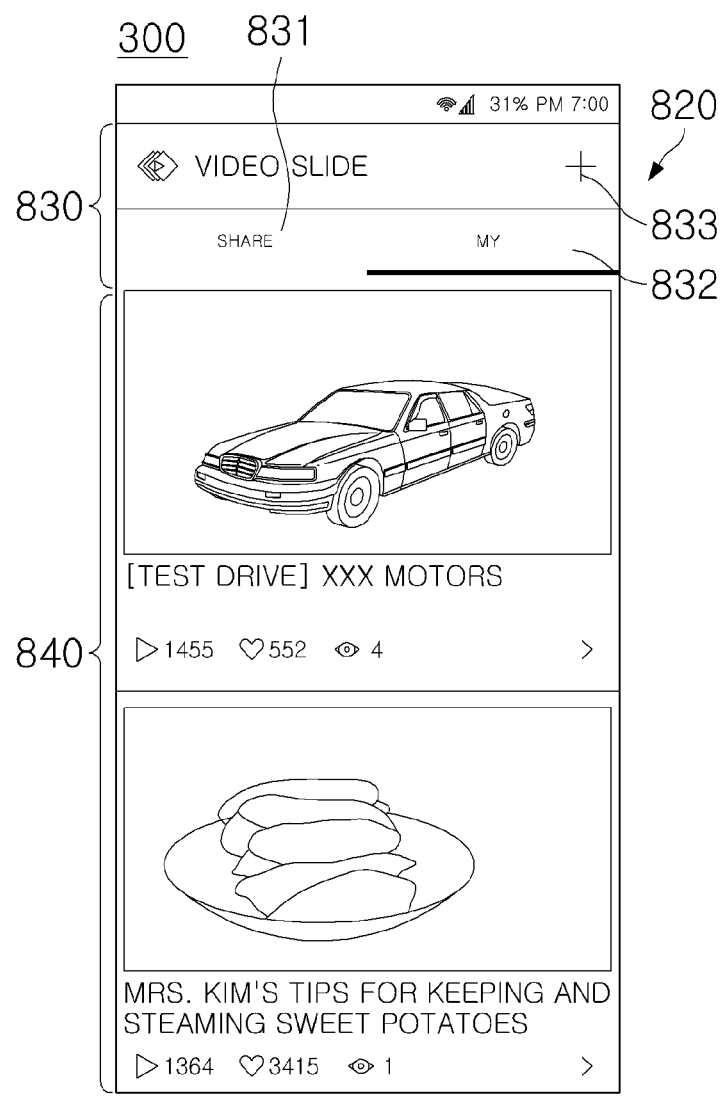

FIGS. 8A and 8B illustrate an operation in which the user terminal 300 displays a main screen of the video slide application.

Referring to FIGS. 8A and 8B, the user terminal 300 may display a home screen 810 on the display unit 335 according to a user command or the like. Here, it is assumed that the home screen 810 includes an app icon 815 corresponding to the video slide application.

When the app icon 815 is selected by a terminal user, the user terminal 300 may execute the video slide application corresponding to the selected app icon 815.

As shown in FIG. 8B, when the application is executed, the user terminal 300 may display a predefined user interface 820 on the display unit 335. The user interface 820 may include an image list area 840 including thumbnail images corresponding to video slide files and a menu area 830 displayed above the image list area 840. The menu area 830 may include a share list menu item 831, a MY list menu item 832, and a storybook menu item 833.

When the share list menu item 831 is selected, the user terminal 300 may display thumbnail images corresponding to shared video slide files in the image list area 840. When the MY list menu item 832 is selected, the user terminal 300 may display thumbnail images corresponding to video slide files stored in a memory on the image list area 840. Title information about a corresponding video slide file may be displayed under each thumbnail image.

When the storybook menu item 833 is selected, the user terminal 300 may provide a storybook screen on which a plurality of pages related to a UGC video is grouped by category. A detailed description will be made below.

FIGS. 9A-9B and 10A-10C illustrate an operation in which a user terminal uploads a UGC video and receives scene meta-information for each playback section.

Referring to FIGS. 9A-9B and 10A-10C, when the video slide application is executed, the user terminal 300 may display a predefined user interface 910 on the display unit 335.

Figure 9A:
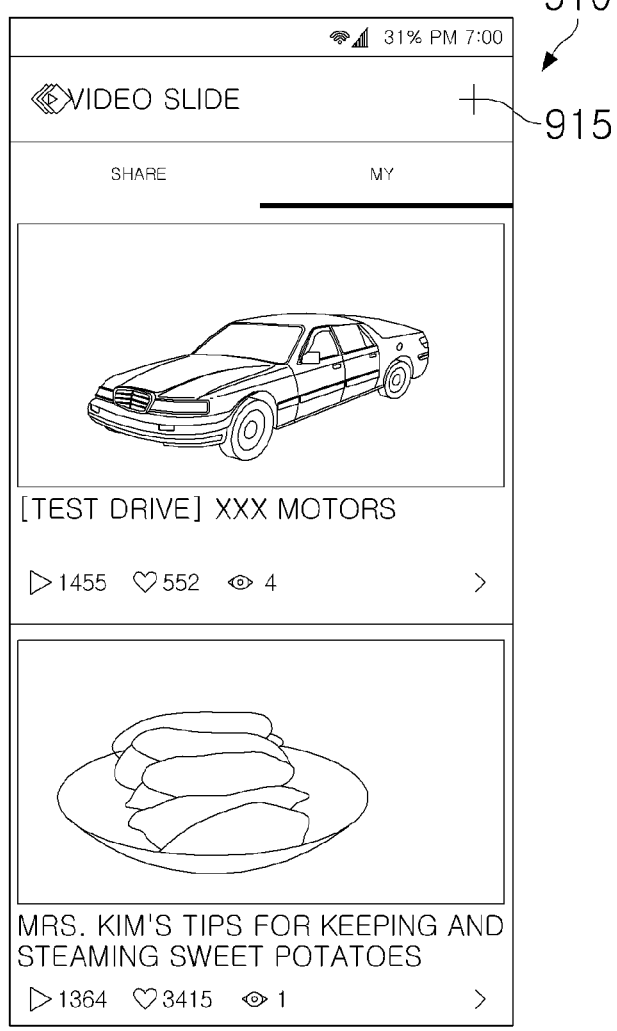
FIGS. 9A-9B and 10A-10C are diagrams illustrating an operation in which a user terminal uploads a UGC video and receives scene meta-information for each playback section.
Figure 9B:
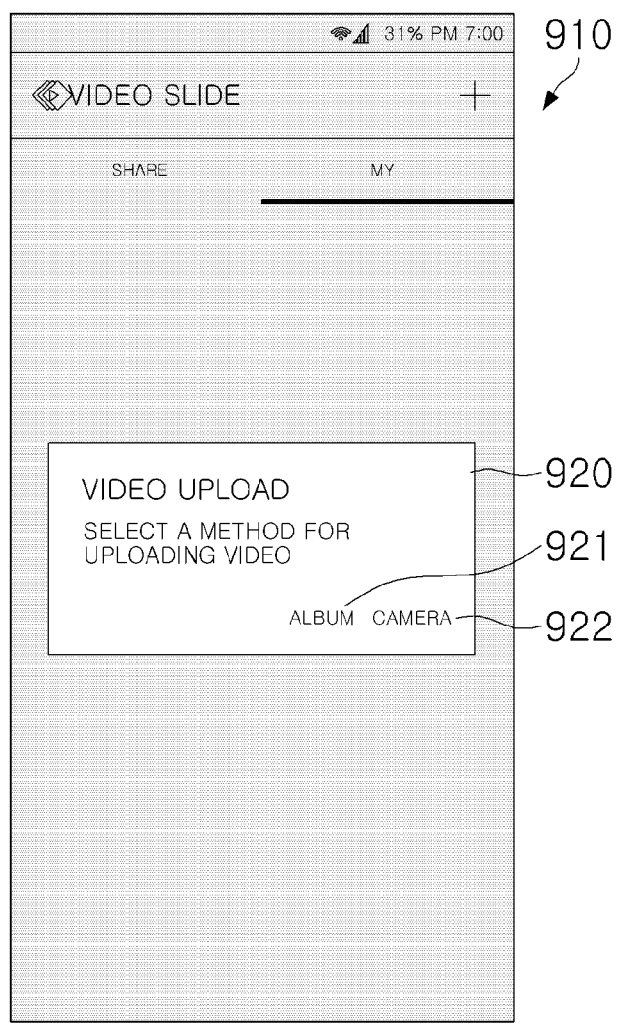

When an upload menu item 915 displayed in one area of the user interface 910 is selected, the user terminal 300 may display a pop-up window 920 for selecting a method for uploading a UGC video on the display unit (FIG. 9B). The pop-up window 920 may include an album menu item 921 and a camera menu item 922.

When the album menu item 921 of the pop-up window 920 is selected, the user terminal 300 may display a selection list screen (not shown) including thumbnail images corresponding to UGC videos stored in a memory, on the display unit 335. When at least one thumbnail image is selected on the selection list screen, the user terminal 300 may upload a UGC video corresponding to the selected thumbnail image to the server 200.

When the camera menu item 922 of the pop-up window 920 is selected, the user terminal 300 may enter a video recording mode and may generate a new UGC video in real time. When video recording is completed, the user terminal 300 may upload the generated new UGC video to the server 200.

Figure 10A:
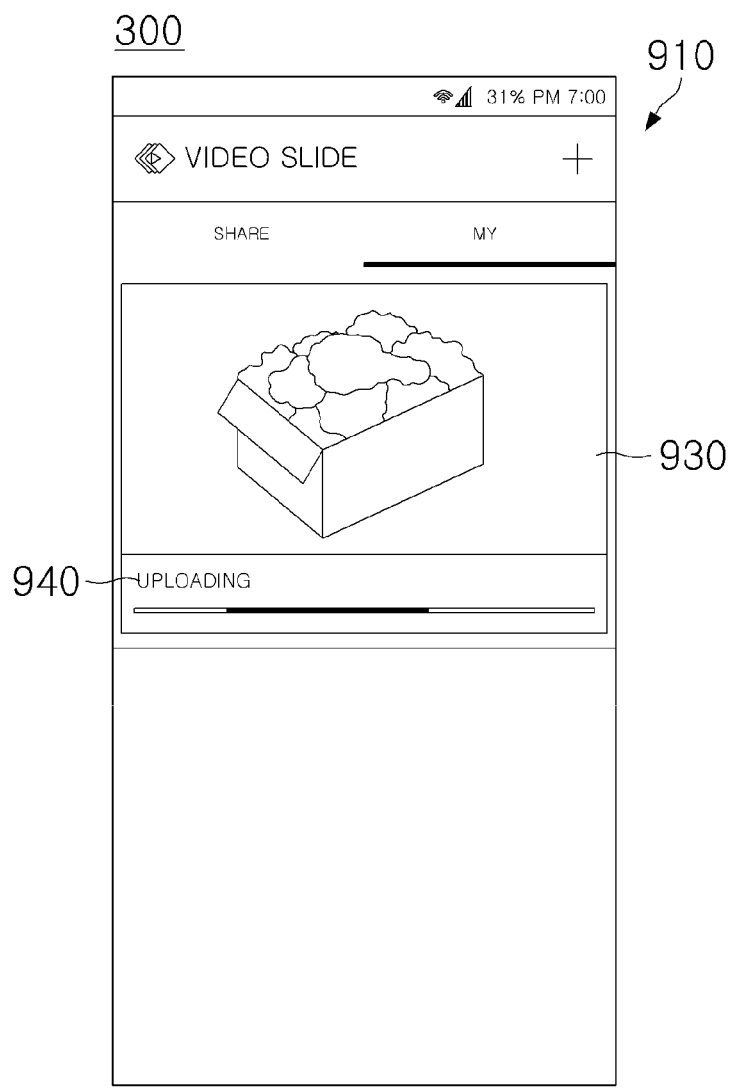
Figure 10B:
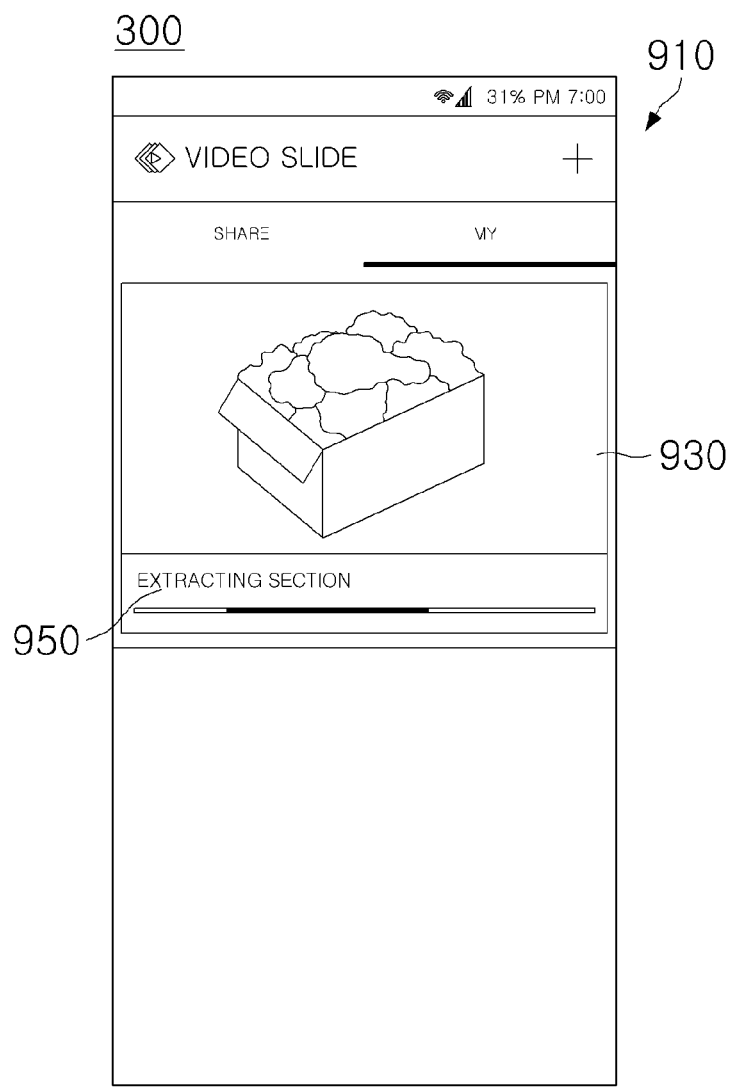
Figure 10C:
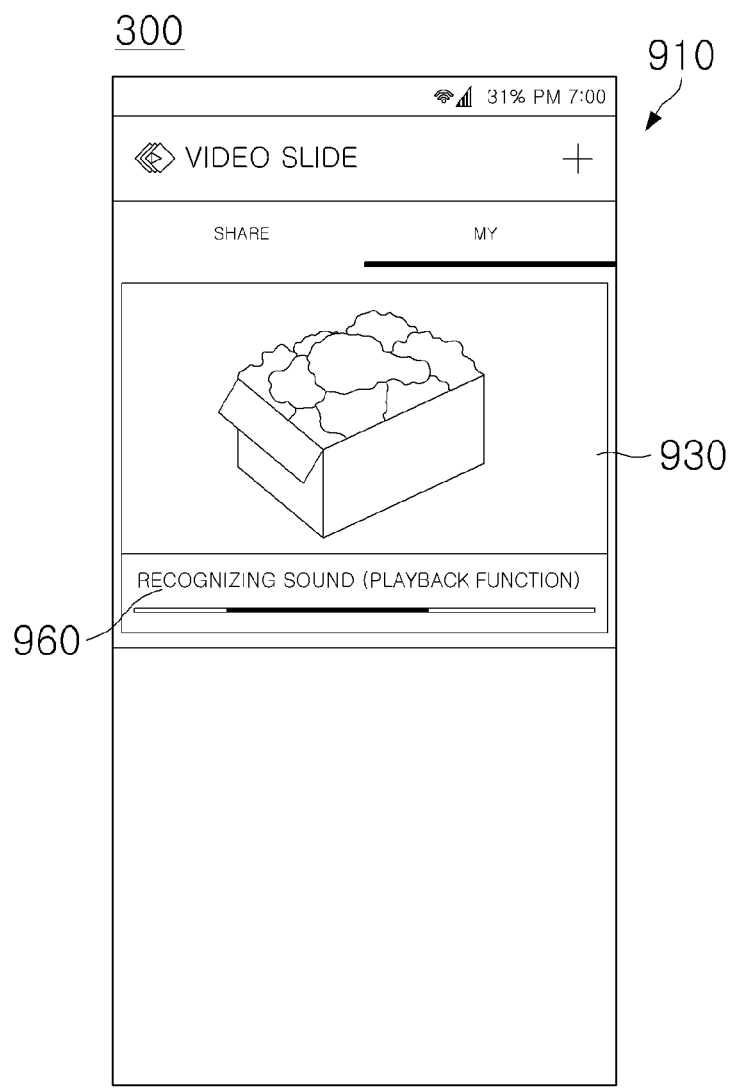

When a UGC video 930 selected through the pop-up window 920 is uploaded to the server 200, the user terminal 300 may display notification information 940, 950, and 960 indicating a process of converting the UGC video into a video slide file on the display unit. For example, as illustrated in FIGS. 10A to 10C, the user terminal 300 may sequentially display notification messages such as "uploading", "extracting a sound section", and "performing sound recognition". When the conversion process is completed, the user terminal 300 may receive scene meta-information for each playback section about the uploaded UGC video from the server 200.

Figure 12:
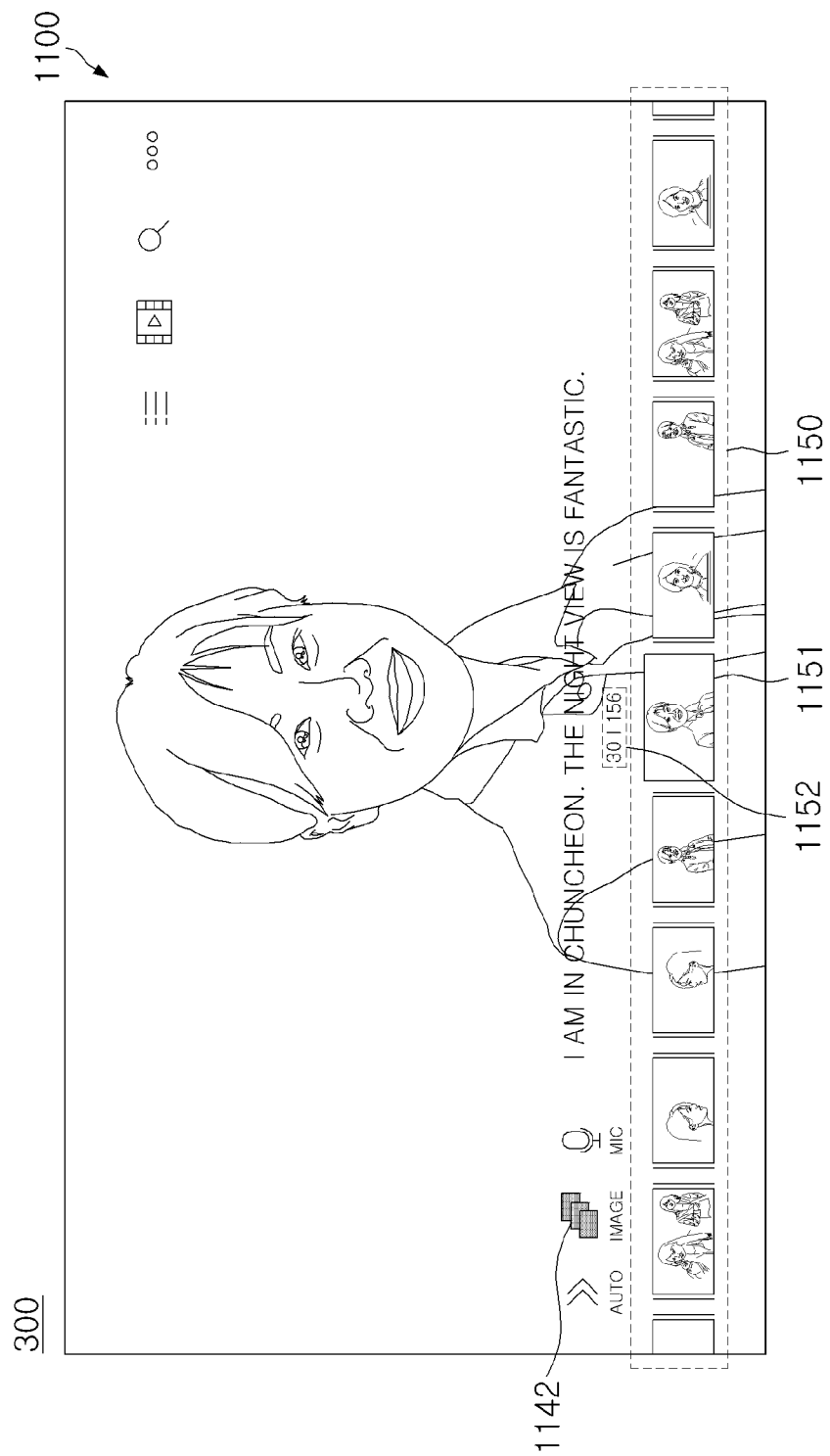

FIG. 11 and FIG. 12 illustrate an operation in which the user terminal 300 displays a UGC video by pages.

Referring to FIG. 11 and FIG. 12, when the video slide application is executed, the user terminal 300 may display a user interface including a plurality of thumbnail images 1151 on the display unit 335. Here, the plurality of thumbnail images 1151 correspond to video slide files related to UGC videos.

When a thumbnail image 1151 is selected through the user interface, the user terminal 300 may execute (play) a video slide file corresponding to the selected thumbnail image. That is, the user terminal 300 may enter a video slide mode in which a UGC video is displayed in pages like a book.

In the video slide mode, the user terminal 300 may display a predetermined page screen 1100 on the display unit 335. Here, the page screen 1100 may include an image display area 1110, a subtitle display area 1120, a first menu area 1130, and a second menu area 1140 but is not limited thereto.

The image display area 1110 may include a representative image corresponding to the current page. The subtitle display area 1120 may include subtitle information corresponding to the current page. The first and second menu areas 1130 and 1140 may include a plurality of menu items for executing functions related to the video slide mode.

The first menu area 1130 may include a first operation menu item (storybook menu item) 1131 for generating a storybook, a second operation menu (mode switch menu item) 1132 for viewing in a video playback mode, a third operation menu item (search menu item) 1133 for searching for a subtitle and/or tag, and a fourth operation menu item (view more menu item) 1134 for further viewing other menu items. The second menu area 1140 may include a fifth operation menu item (automatic switch menu item) 1141 for automatically switching a page screen, a sixth operation menu item (preview menu item) 1142 for previewing previous and subsequent pages of the current page, and a seventh operation menu item (microphone menu item) 1143 for activating a sound recognition mode.

When the preview menu 1142 of the second menu area 1140 is selected with the page screen 1100 displayed, the user terminal 300 may execute a function of previewing previous and subsequent pages of the current page. For example, as illustrated in FIG. 12, the user terminal 300 may display a scroll area 1150 including a plurality of thumbnail images 1151 corresponding to pages existing before and after the current page at the bottom of the display unit 335. The plurality of thumbnail images 1151 is images obtained by reducing the size of representative images corresponding to a plurality of pages to a predetermined size. The plurality of thumbnail images 1151 may be sequentially arranged according to the time codes of the pages. In addition, the plurality of thumbnail images 1151 may be configured to be scrolled according to a predetermined gesture input.

The thumbnail image 1151 of the current page may be positioned in the middle of the scroll area 1150. That is, a page currently viewed by a viewer may be positioned in the middle of the scroll area 1150. The viewer may select one of the thumbnail images 1151 positioned in the scroll area 1150, thereby directly moving to a page corresponding to the thumbnail image.

When the storybook menu item 1131 of the first menu area 1130 is selected, the user terminal 300 may provide a storybook screen on which a plurality of pages related to a UGC video is grouped by category. A detailed description will be made below.

When the mode switch menu item 1132 of the first menu area 1130 is selected, the user terminal 300 may switch the video slide mode to the video playback mode and may then play a playback section of the UGC video corresponding to a sound section of the current page.

When the search menu item 1133 of the first menu area 1130 is selected, the user terminal 300 may display a search window (not shown) for searching for a subtitle or a tag on the display unit 335. When predetermined text information is input through the search window, the user terminal 300 may search for a page including subtitle or tag information corresponding to the text information and may display the page on the display unit.

When the microphone menu item 1143 of the second menu area 1140 is selected, the user terminal 300 may activate a microphone and may enter a sound recognition mode. When entering the sound recognition mode, the user terminal 300 may execute a video slide operation corresponding to a user's voice command. Accordingly, the terminal user may conveniently use a video slide service in a situation in which it is difficult to use a hand.

When a flicking input having a first directivity is received through the display unit 335 with the page screen 1100 displayed, the user terminal 300 may display the screen of the next page from the current page on the display unit. When a flicking input having a second directivity is received through the display unit 335, the user terminal 300 may display the screen of a previous page from the current page on the display unit. In this manner, the user terminal 300 may easily switch the page screen through a predetermined gesture input. When the automatic switch menu item 1141 of the second menu area 1140 is selected, the user terminal 300 may display the screen of the current page for a predetermined time and may then automatically switch to the screen of the next page. Further, the user terminal 300 may perform a high-speed search function in response to a predetermined gesture input (e.g., a long touch input).

As described above, the user terminal 300 may interwork with a server 200 to provide the video slide service for viewing a UGC video in pages like a book.

Figure 13:
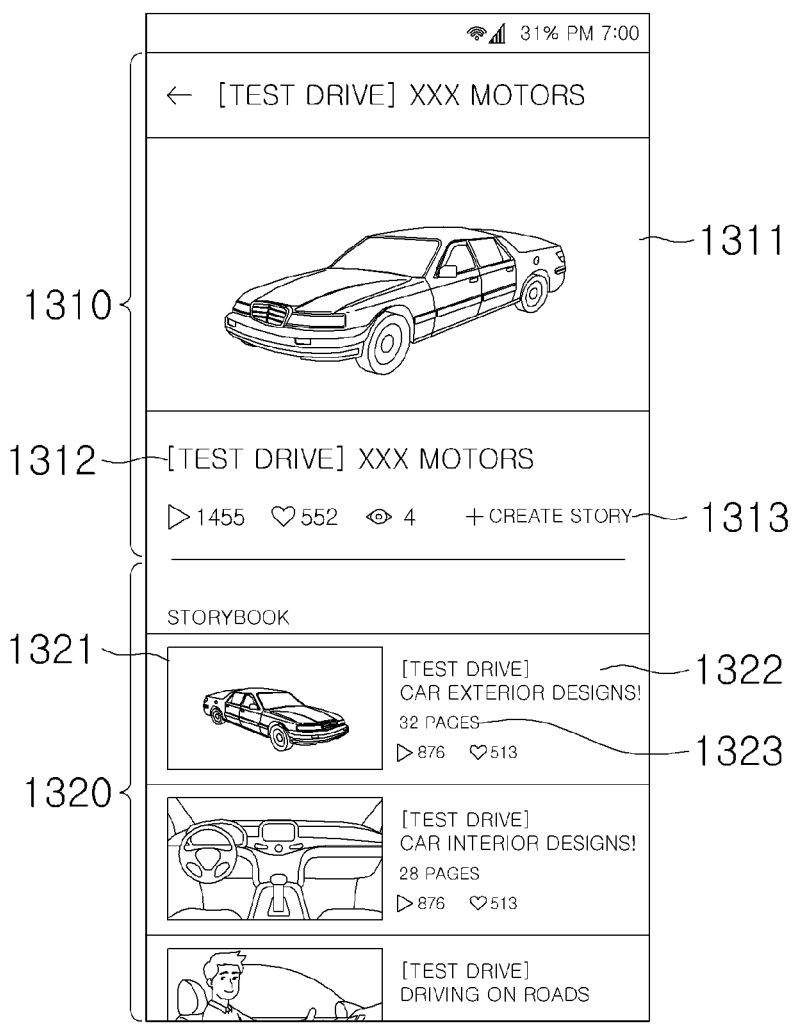
FIGS. 13 to 15 are diagrams illustrating an operation in which a user terminal displays a plurality of pages grouped by category.
Figure 14:
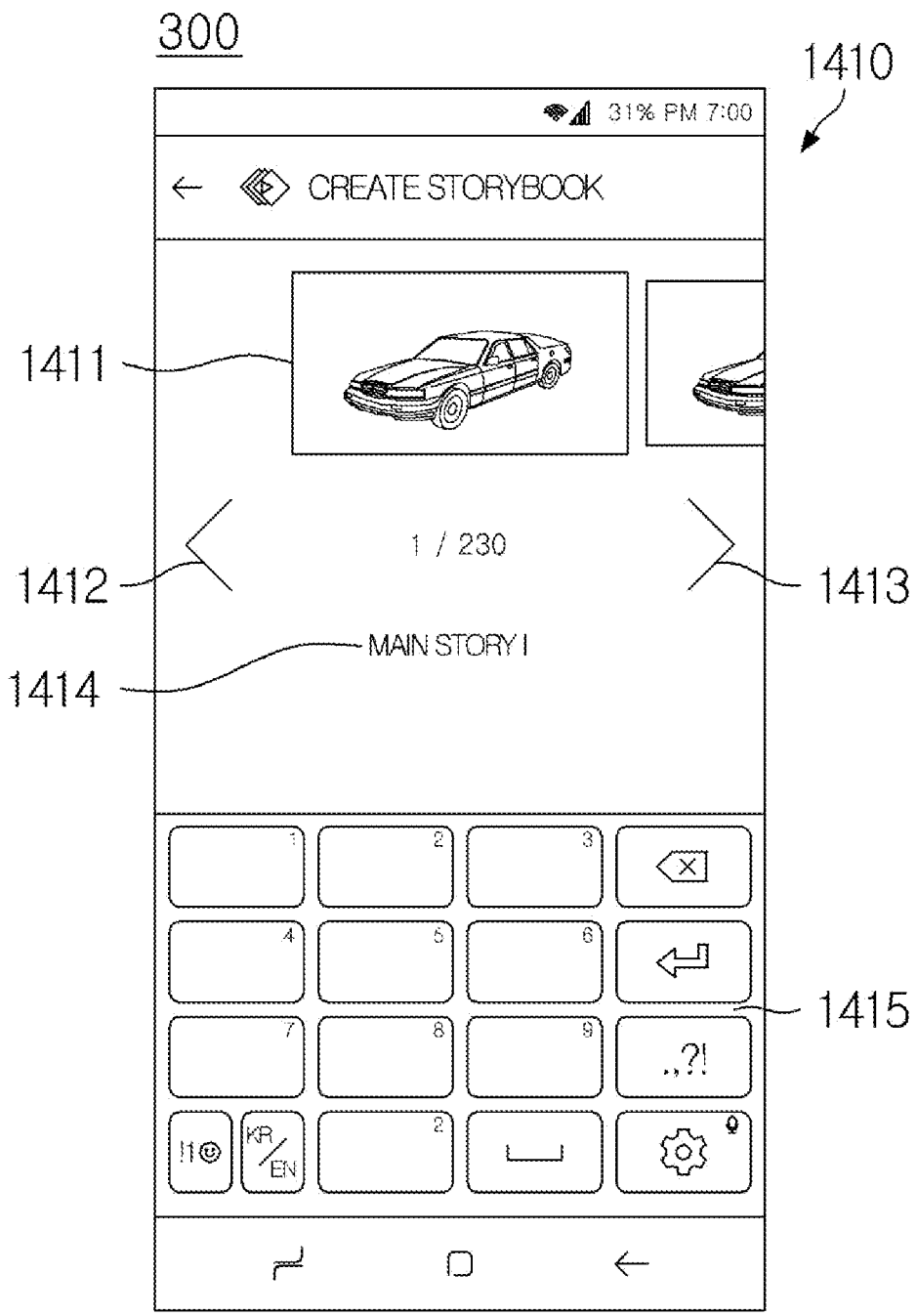
Figure 15:
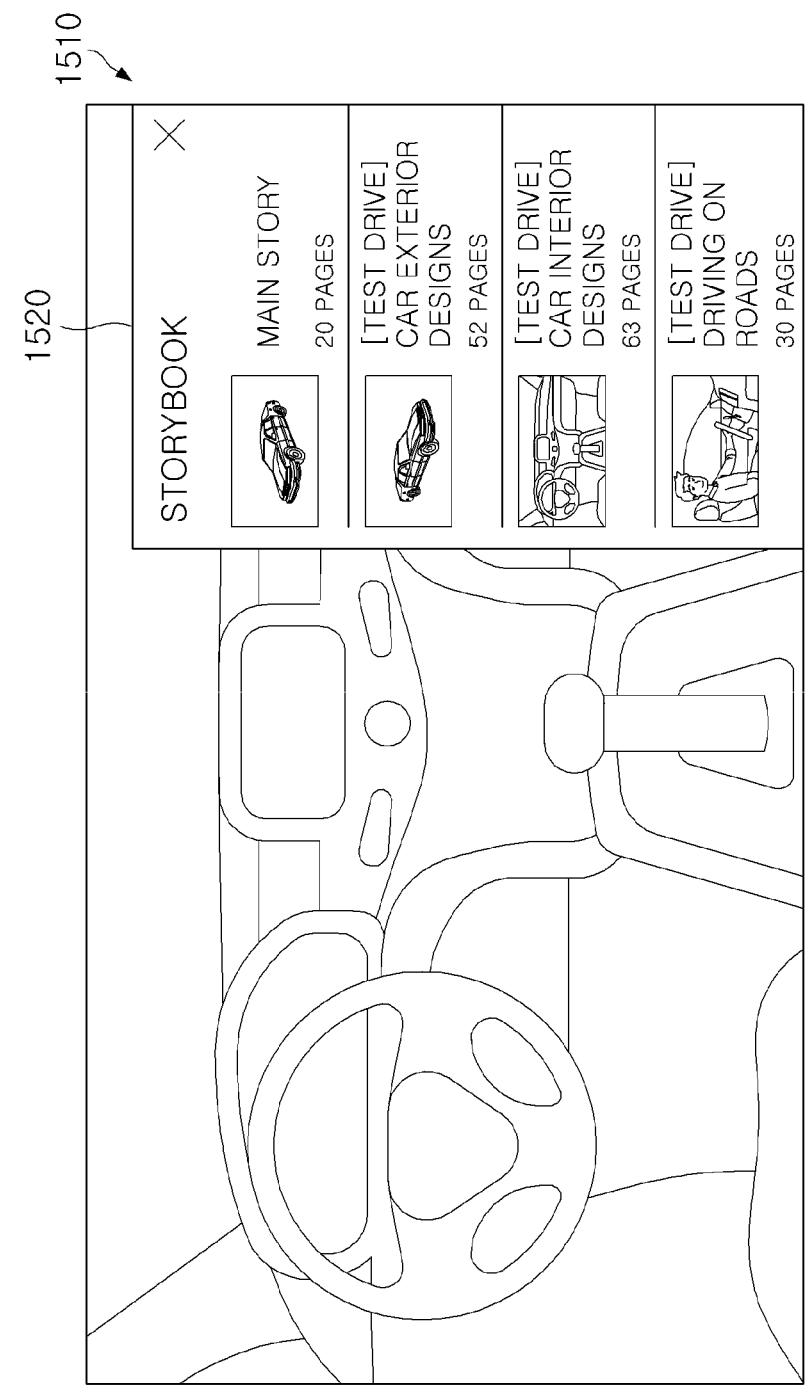

FIG. 13 to FIG. 15 illustrate an operation in which the user terminal 300 displays a plurality of pages grouped by category.

Referring to FIG. 13 to FIG. 15, when the storybook menu item 1131 is selected, the user terminal 300 may display a selection list screen (not shown) including thumbnail images corresponding to a plurality of video slide files on the display unit 335.

When at least one thumbnail image is selected on the selection list screen, the user terminal 300 may generate a storybook based on a video slide file corresponding to the selected thumbnail image. That is, the user terminal 300 may classify a plurality of pages forming the selected video slide file by category based on category information stored in the video slide file. The user terminal 300 may generate the storybook based on a plurality of page groups classified by category.

When generating the storybook, the user terminal 300 may display storybook items corresponding to the plurality of page groups on the display unit 335. For example, as illustrated in FIG. 13, the user terminal 300 may display a thumbnail image 1311 corresponding to a video slide file selected by a user and title information 1312 about the file in a first display area 1310. The user terminal 300 may display the storybook items corresponding to the plurality of page groups in a second display area 1320. Each storybook item may include a thumbnail image 1321 corresponding to each page group, category information 1322 about the page group, and information 1323 about the number of pages in the page group.

In another embodiment, when generating the storybook, the user terminal 300 may display a user interface including the storybook items corresponding to the plurality of page groups on a full screen.

When a story generation menu item 1313 displayed in the first display area 1310 is selected, the user terminal 300 may display a user interface for manually generating a storybook item related to the UGC video on the display unit 335. For example, as illustrated in FIG. 14, the user terminal 300 may display, on the display unit 335, a user interface 1410 including a page selection area 1411 for selecting a page to be included in a storybook item, a previous icon 1412 for going to a previous page, a next icon 1413 for going to a next page, category information (i.e., title information) 1414 about the storybook item, a keypad window 1415 for inputting the category information, and the like. The terminal user may directly generate a storybook related to a UCG video through the user interface 1410.

In a video slide mode, the user terminal 300 may display a screen 1510 of one page of a plurality of pages forming a specific video slide file on the display unit. When the storybook menu item (not shown) is selected with the screen 1510 of the page displayed, the user terminal 300 may display storybook items 1520 in which the plurality of pages is grouped by category in a portion of the screen 1510 of the page.

The content providing server, the content providing terminal, and the content providing method according to embodiments of the present disclosure may have the following effects.

According to at least one of the embodiments of the present disclosure, scene meta-information for each playback section may be generated using information extracted from a user-generated content (UGC) video and a video slide service may be provided based on the scene meta-information, thereby enabling a viewer (user) to watch the UGC video by pages like a book.

Further, according to at least one of embodiments of the present disclosure, a plurality of pages for providing a video slide service may be generated and provided as being grouped by category, thereby enabling a viewer (user) to selectively view only a subject of interest among various subjects included in a UGC video.

The effects obtainable by the content providing server, the content providing terminal, and the content providing method according to embodiments of the present disclosure are not limited to the effects mentioned above, and other effects not mentioned will be clearly understood by those skilled in the art from the following description.

The present disclosure described above can be realized as a computer-readable code in a medium recording a program. A computer-readable medium may keep storing a computer-executable program or may temporarily store the computer-executable program for execution or download. Further, the recording medium may include various recording devices or storage devices in a form in which a single piece or a plurality of pieces of hardware is combined and may be distributed on a network without being limited to a medium directly connected to a computer system. Examples of the recording medium may include those configured to store a program instruction including a magnetic medium, such as a hard disk, a floppy disk, and a magnetic tape, an optical recording medium, such as a CD-ROM and a DVD, a magneto-optical medium, such as a floptical disk, a ROM, a RAM, a flash memory, and the like. In addition, other examples of the medium may include an app store that distributes applications, a site that supplies or distributes various types of software, and a recording medium or a storage medium managed by a server. Therefore, the above detailed description should not be construed as restrictive in all aspects and should be considered as illustrative. The scope of the present disclosure should be determined based on reasonable interpretation of the appended claims, and all changes and modifications within the equivalent scope of the present disclosure are included in the scope of the present disclosure.

What is claimed is:

1. An operating method of a user terminal including a processor, comprising:
   uploading a user-generated content (UGC) video to a server, the UGC video comprising a plurality of playback sections;
   receiving scene meta-information for each of said playback sections corresponding to the UGC video from the server;
   generating, by the processor, a video slide file based on the received scene meta-information for each of said playback sections, the video slide file comprising a plurality of pages corresponding to the plurality of playback sections, wherein each of said pages includes a representative image, where the representative image is associated with an image frame selected from among a plurality of image frames within an associated one of said playback sections;
   classifying, by the processor, the plurality of pages of the video slide file by category into a plurality of page groups;
   generating, by the processor, a storybook corresponding to the UGC video based on the classified plurality of page groups, wherein the page groups of the storybook are all from the UGC video;
   displaying, on a first display area of a screen, an image corresponding to the video slide file generated by the processor;
   displaying, on a second display area of the screen, an image corresponding to each of the plurality of page groups classified by category; and
   displaying one of the plurality of pages of the video slide file in response to a user selection on the image corresponding to the video slide file.

2. The operating method as claimed in claim 1, wherein the video slide file comprises the plurality of pages corresponding to the scene meta-information for each of said playback sections of the UGC video and category information for each page.

3. The operating method as claimed in claim 2, wherein the scene meta-information for each of said playback sections is generated based on information extracted from the UGC video.

4. The operating method as claimed in claim 2, wherein the scene meta-information for each of said playback sections comprises time code information, representative image information, and subtitle information.

5. The operating method as claimed in claim 1, wherein each of the plurality of pages comprises representative image information and subtitle information for each of said playback sections of the UGC video.

6. The operating method as claimed in claim 1, wherein the generating of the storybook comprises generating storybook items corresponding to the plurality of page groups.

7. The operating method as claimed in claim 6, wherein each storybook item comprises at least one of a thumbnail image corresponding to each page group, category information of each page group, and information regarding a number of pages in each page group.

8. The operating method as claimed in claim 6, further comprising:
displaying a user interface comprising the storybook items on a display unit.

9. The operating method as claimed in claim 8, further comprising:
in response to a user selection on one of the storybook items, displaying a page belonging to a page group corresponding to the user selected storybook item.

10. The operating method as claimed in claim 1, further comprising:
outputting sound information corresponding to the page when the page is displayed.

11. The operating method as claimed in claim 1, wherein the scene meta-information for each of said playback sections is received by a streaming method from the server.

12. The operating method as claimed in claim 1, wherein the receiving of scene meta-information comprises:
receiving first scene meta-information comprising time code information and representative image information for each of said playback sections of the UGC video; and
receiving second scene meta-information comprising subtitle information for each of said playback sections of the UGC video.

13. The operating method as claimed in claim 1, further comprising:
displaying notification information indicating a process of converting the UGC video into the video slide file.

14. The operating method as claimed in claim 1, further comprising:
displaying an app icon corresponding to a video slide application; and
displaying a predefined user interface screen in response to a user selection of the app icon.

15. The operating method as claimed in claim 14, wherein the user interface screen comprises a file list area comprising thumbnail images corresponding to video slide files and a menu area comprising menu items related to the video slide application.

16. The operating method as claimed in claim 15, wherein the menu area comprises a storybook menu for generating the storybook corresponding to the UGC video.

17. A non-transitory computer-readable storage medium storing a program for enabling a computer to execute the operating method as claimed in claim 1.

18. A user terminal comprising:
a communication unit configured to provide a communication interface with a server;
a display unit configured to display a predetermined user interface; and
a control unit comprising a memory storing program instructions that when executed by a processor is configured to:
upload a user-generated content (UGC) video to the server using an upload menu included in the user interface, the UGC video comprising a plurality of playback sections,
generate a video slide file based on scene meta-information for each of said playback sections of the UGC video upon receiving the scene meta-information for each of said playback sections from the server, the video slide file comprising a plurality of pages corresponding to the plurality of playback sections, wherein each of said pages includes a representative image, where the representative image is associated with an image frame selected from among a plurality of image frames within an associated one of said playback sections,
classify the plurality of pages of the video slide file by category into a plurality of page groups,
generate a storybook corresponding to the UGC video based on the classified plurality of page groups, wherein the page groups of the storybook are all from the UGC video;
display, on a first display area of a screen, an image corresponding to the video slide file generated by the processor; and
display, on a second display area of the screen, an image corresponding to each of the plurality of page groups classified by category.

* * * * *